United States Patent
Katsuragi et al.

(10) Patent No.: US 7,189,014 B2
(45) Date of Patent: Mar. 13, 2007

(54) PRODUCTION PROCESS OF LIGHT AMOUNT-ADJUSTING MEMBER, LIGHT AMOUNT-ADJUSTING MEMBER, LIGHT AMOUNT-ADJUSTING DEVICE AND PHOTOGRAPHING APPARATUS

(75) Inventors: Ryuji Katsuragi, Tokyo (JP); Takeshi Miyazaki, Kanagawa (JP); Osamu Kanome, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 10/902,150

(22) Filed: Jul. 30, 2004

(65) Prior Publication Data

US 2005/0084774 A1 Apr. 21, 2005

(30) Foreign Application Priority Data

Aug. 5, 2003 (JP) ............................ 2003-205975
Jul. 14, 2004 (JP) ............................ 2004-206681

(51) Int. Cl.
G03B 9/02 (2006.01)
G02B 5/22 (2006.01)

(52) U.S. Cl. ...................................... 396/505; 359/888
(58) Field of Classification Search ................ 396/505; 359/888–890; 348/36, 37, 40, 42, 336, 337, 348/340, 342
See application file for complete search history.

(56) References Cited

U.S. PATENT DOCUMENTS

| | | | |
|---|---|---|---|
| 4,416,961 A * | 11/1983 | Drexhage | 430/7 |
| 5,096,781 A * | 3/1992 | Vieira et al. | 428/32.1 |
| 5,293,542 A * | 3/1994 | Ise et al. | 348/363 |
| 5,479,298 A * | 12/1995 | Yanagi et al. | 359/888 |
| 5,609,671 A | 3/1997 | Nagasawa | 106/20 R |
| 5,725,959 A | 3/1998 | Terada et al. | 428/448 |
| 6,217,796 B1 * | 4/2001 | Hasegawa et al. | 252/587 |
| 6,319,309 B1 * | 11/2001 | Lavery et al. | 106/31.27 |
| 6,589,672 B1 | 7/2003 | Kobayashi et al. | 428/690 |
| 6,713,227 B2 | 3/2004 | Machiguchi et al. | 430/270.1 |
| 6,821,691 B2 * | 11/2004 | Machiguchi et al. | 430/7 |
| 6,866,431 B2 * | 3/2005 | Namazue et al. | 396/450 |
| 6,927,798 B2 * | 8/2005 | Kaneda | 348/363 |
| 6,929,890 B2 * | 8/2005 | Miyoshi et al. | 430/7 |
| 6,985,170 B1 * | 1/2006 | Tsuyuki | 348/65 |
| 7,070,344 B2 * | 7/2006 | Kanome et al. | 396/505 |
| 2002/0042008 A1 * | 4/2002 | Ueda et al. | 430/7 |

FOREIGN PATENT DOCUMENTS

| | | |
|---|---|---|
| JP | 5-173004 | 7/1993 |
| JP | 5-186704 | 7/1993 |
| JP | 6-95208 | 4/1994 |
| JP | 6-273601 | 9/1994 |
| JP | 8-3498 | 1/1996 |
| JP | 11-96971 | 4/1998 |
| JP | 11-14923 | 1/1999 |
| JP | 11-15042 | 1/1999 |
| JP | 2000-309726 | 11/2000 |
| JP | 2001-166122 | 6/2001 |
| JP | 2001-330709 | 11/2001 |
| JP | 2002-14221 | 1/2002 |
| JP | 2002-212471 | 7/2002 |
| JP | 2002-268120 | 9/2002 |

* cited by examiner

Primary Examiner—W. B. Perkey
Assistant Examiner—Rishi S. Suthar
(74) Attorney, Agent, or Firm—Fitzpatrick, Cella, Harper & Scinto

(57) ABSTRACT

A process for producing a light amount-adjusting member, such as an ND filter, that comprises the steps of providing a transparent base material and a coloring liquid; and applying a coloring liquid to the base material by ejecting the coloring liquid to the base material to form a colored portion having a specified optical density, wherein the coloring liquid contains at least one coloring material of with a maximum absorption wavelength in a range of 630 to 750 nm, when measured on the transparent base material.

12 Claims, 8 Drawing Sheets

PRODUCTION PROCESS OF LIGHT AMOUNT-ADJUSTING MEMBER, LIGHT AMOUNT-ADJUSTING MEMBER, LIGHT AMOUNT-ADJUSTING DEVICE AND PHOTOGRAPHING APPARATUS

BACKGROUND OF THE INVENTION

1. Field of the Invention

The present invention relates to a light amount-adjusting member in a light amount-adjusting device, for example, a light-reducing filter, used in a photographing apparatus, such as a camera, and various other optical instruments. Particularly, the present invention relates to a production process of a light amount-adjusting member suitable for use in production of a neutral density filter in the visible light range (400 to 700 nm), a light amount-adjusting member obtained by the process, and a light amount-adjusting device and a photographing apparatus using the light amount-adjusting member produced by the process.

2. Related Background Art

Conventionally, various optical instruments, such as digital and video cameras, use a diaphragm device in order to adjust the amount of incident light. In particular, in such devices, the amount of incident light is adjusted using diaphragm blades. When the diaphragm aperture becomes very small against a highly luminous subject, however, resolution deteriorates because of diffraction. Thus, the amount of passing light is adjusted by using a neutral density filter (hereinafter abbreviated as "ND filter") or the like as a light amount-adjusting member in addition to the diaphragm, thereby preventing the image quality from deteriorating. More specifically, the diaphragm is constructed that the ND filter, which is a member separated from the diaphragm blades, is fitted to a part of the diaphragm blade with an adhesive, whereby a diaphragm aperture is maintained at a certain size without excessively being stopped down. The ND filter is located on an optical axis to limit the amount of passing light. Further, when an ND filter having a gradient in its light amount-adjusting function (hereinafter referred to as "density gradient") is used, and this filter is moved on the optical axis, further light amount adjustments may be conducted. Alternatively, there have been proposed various diaphragm devices in which an ND filter is not adhered to a diaphragm blade, but acts independently.

The ND filter, a light amount-adjusting member in a light amount-adjusting device as described above, may, for example, have a metal film or a dielectric film formed thereon by vapor deposition etc., or have a multi-layered metal or dielectric films formed by lamination, because these materials have good optical characteristics and excellent durability. Other production processes include those of a type where a light-absorbing dye or pigment is mixed and incorporated into glass, cellulose acetate, PET or the like, which is a transparent film-forming material, and of a type in which a light-absorbing dye or pigment is applied to a transparent base material composed of the above-described material. Further, as disclosed in Japanese Patent Application Laid-Open No. H5-173004, a production process of an ND filter using a silver halide film has also been proposed. In addition, a light amount-adjusting member having a density gradient is utilized as a light amount-adjusting device for a laser beam printer or the like as disclosed in, for example, Japanese Patent Application Laid-Open No. H11-14923, although its spectral transmission characteristics are not constant. In Japanese Patent Application Laid-Open No. 2002-268120, it is described that a light interrupting portion of an optical functional filter is formed by printing with a black coating or the like, and the printing system includes various systems, such as a transfer system, an ink-jet system, a stamping system and a system that applies a photosensitive coating to a surface of a plate to expose it to light. It is also described that the optical functional filter functions as a near infrared-absorbing filter, an optical low-pass filter, an ND filter and a color tone filter.

However, the ND filter obtained by forming the coating by vapor deposition has a problem in that its production cost becomes high because the production apparatus becomes large in scale, and the production process is complicated. The process that can be used to form the ND filters by incorporating a dye or pigment into the material during film formation or the process that forms ND filters by applying a dye or pigment to the surface of the base material can produce a filter having a uniform density. However, it is very difficult to produce a filter having a density gradient. According to the production process using the silver halide film, a filter having a density gradient can be produced. However, the production process involves a problem in that light scattering is caused by silver particles remaining in the film to deteriorate the optical characteristics. In the case where the ND filter is produced by the ink-jet system, it has been difficult to produce an ND filter having almost constant spectral characteristics in a visible range of from 400 nm to 700 nm, particularly from 600 nm to 700 nm, while retaining ejection stability in ink jet recording.

SUMMARY OF THE INVENTION

Accordingly, it is an object of the present invention to provide a production process of a light amount-adjusting member, by which a light amount-adjusting member having excellent optical characteristics, particularly, an ND filter having almost uniform spectral transmission properties in the range from 400 nm to 700 nm, particularly from 600 nm to 700 nm, and having a density gradient can be produced simply and at a low cost.

Another object of the present invention is to provide a light amount-adjusting device and a photographing apparatus, equipped with an inexpensive light amount-adjusting member that has excellent optical properties and produced by the above process.

The above objects can be achieved by the present invention described below.

[1] In an aspect of the present invention, there is thus provided a process for producing a light amount-adjusting member that comprises the steps of: providing a transparent base material and a coloring liquid; and applying a coloring liquid to the base material by ejecting the coloring liquid to the base material to form a colored portion having a specified optical density, wherein the coloring liquid contains at least one coloring material with a maximum absorption wavelength in a range of 630 to 750 nm, when a solution of the coloring material applied onto the transparent base material is measured.

The following [2]–[13] are preferred modes of the production process of this invention [1].

[2] A method as described above in [1], where a layer for receiving the coloring liquid is provided on a transparent substrate.

[3] A method as described above process [1], wherein the coloring material is C.I. Direct Black 168.

[4] A process as described above in [1], wherein the coloring material is a compound having a phthalocyanine skeleton.

[5] A process as described above in [1], wherein the coloring liquid contains at least C.I. Direct Black 168 and the compound having the phthalocyanine skeleton.

[6] A process as described above in [4], wherein the compound having the phthalocyanine skeleton is represented by the following general formula (1):

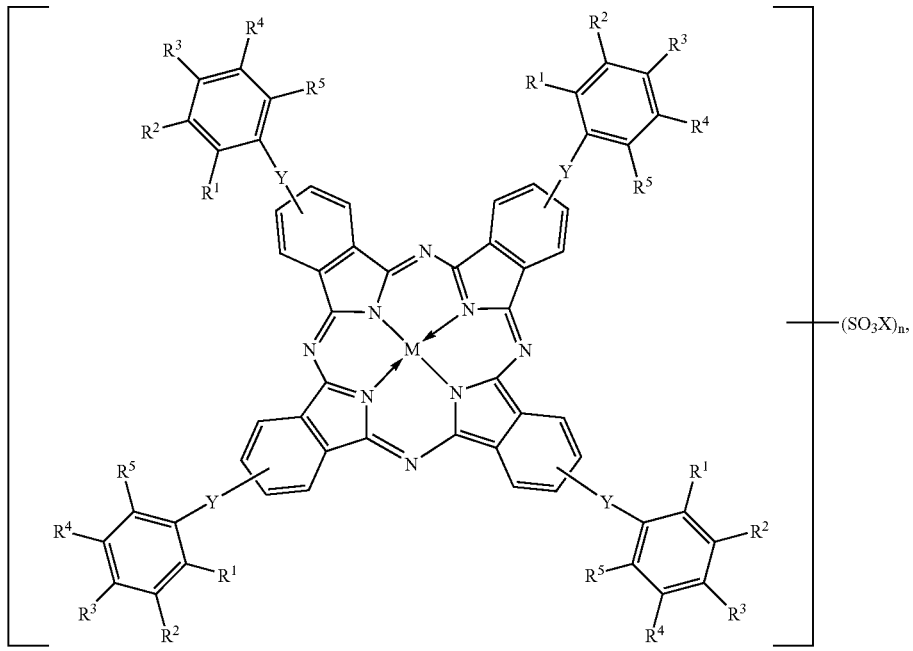

wherein Y is O or S, $R^1$, $R^2$, $R^3$, $R^4$ and $R^5$ are the same or different, and independently selected from the group consisting of hydrogen, halogen, a linear, branched or cyclic alkyl group having 1 to 8 carbon atoms, a linear, branched or cyclic alkoxy group having 1 to 8 carbon atoms, a linear or branched hydroxyalkyl group having 1 to 8 carbon atoms, a sulfone group, a sulfonamide group, a carboxyl group, a hydroxyl group, a cyano group, a nitro group, an amino group, a phosphono group, a trifluoromethyl group, —$NR^6R^7$, wherein $R^6$ and $R^7$ are independently hydrogen or an alkyl group having 1 to 8 carbon atoms, —$NHCOCH_3$, —$NHCOCH_2OH$, —$NHCOC_6H_5$, a substituted or not substituted phenyl group, a substituted or not substituted naphthyl group, a substituted or not substituted phenoxy group, and a substituted or not substituted thiophenoxy group; M is selected from the group consisting of a non-metal, metal, metal oxide or metal halide; X is hydrogen, an alkali metal, ammonium or an organic ammonium; and n is an integer of 1 to 20.

[7] A process as described above in [1], wherein the coloring material has a cyanine skeleton.

[8] A process as described above in [1], wherein the coloring liquid contains at least C.I. Direct Black 168 and a compound having the cyanine skeleton.

[9] A process as described above in [7], wherein the compound having the cyanine skeleton is a compound represented by the following general formula (2):

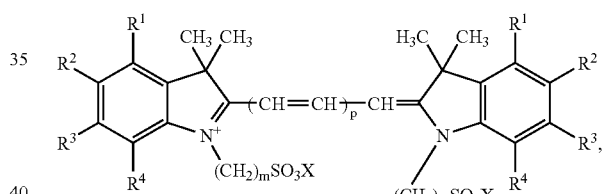

wherein $R^1$, $R^2$, $R^3$ and $R^4$ are the same or different, and independently selected from the group consisting of hydrogen, an alkyl group having 1 to 8 carbon atoms, an alkoxy group having 1 to 8 carbon atoms, a hydroxyalkyl group having 1 to 8 carbon atoms, a substituted or not substituted phenyl group, a sulfone group, a carboxyl group, an amino group, —$NR^6R^7$, wherein $R^6$ and $R^7$ are, independently, hydrogen or an alkyl group having 1 to 8 carbon atoms, —$NHCOCH_3$, —$NHCOCH_2OH$, —$NHCOC_6H_5$ and halogen; X is selected from the group consisting of hydrogen, an alkali metal, ammonium and an organic ammonium and m and p are integers of 1 to 10.

[10] A process as described above in [1], which further comprises the step of providing a transparent layer to the surface of the colored portion after the step of forming the colored portion.

[11] A process as described above in [10], which further comprises the step of vapor-depositing an inorganic coating on the surface of the transparent layer provided by the step of providing the transparent layer on the surface of the colored portion, and/or the surface of the transparent base material.

[12] A process as described above in [1], wherein the coloring liquid is applied in varying amounts or a plurality of the coloring liquids containing partially different coloring materials are applied to form a colored region with the optical density changing continuously or stepwise in the region.

[13] A process as described above [1], wherein the light amount-adjusting member is a neutral density filter.

[14] Another aspect of the present invention is a light amount-adjusting member produced by the above described production process.

[15] A further aspect of the present invention is a light amount-adjusting device having the above light amount-adjusting member.

[16] A still further aspect of the present invention is a photographing apparatus that comprises a light amount-adjusting device, a photographing optical system for forming a subject image, an image pickup means for photoelectrically converting the subject image formed, and a recording means for recording a signal photoelectrically converted, wherein the light amount-adjusting device is as described above, and the light amount-adjusting device is arranged in the photographing optical system.

DETAILED DESCRIPTION OF THE PREFERRED EMBODIMENTS

Figure 1A:
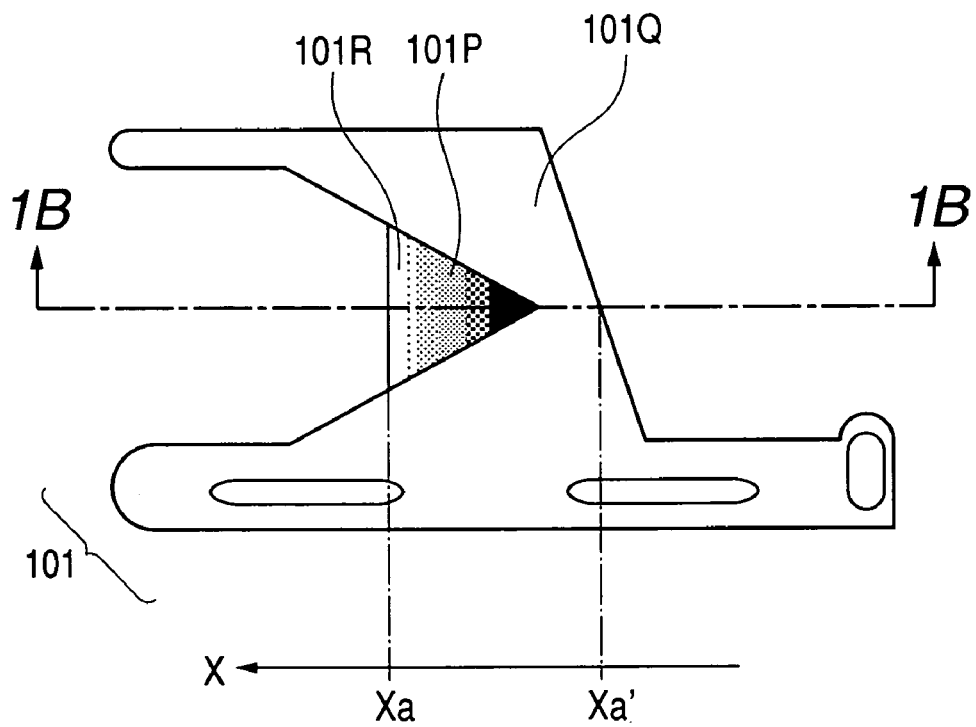
FIGS. 1A and 1B schematically illustrate a diaphragm blade equipped with a light amount-adjusting member according to the present invention.

The present invention will hereinafter be described in more detail by referring to the preferred embodiments thereof.

First, the coloring material in accordance with the present invention will be described. The production process of a light amount-adjusting member according to the present invention comprises the steps of providing a transparent base material and a coloring liquid containing a coloring material, and applying the coloring liquid to the base material by ejection to form a colored portion of a predetermined optical density. The present invention utilizes a coloring material having a maximum absorption in the wavelength range of 630 to 750 nm. The measurement conditions are as follows: a test solution containing the object coloring material is applied to a transparent base material, preferably, to a receiving layer side of the transparent base material when a receiving layer for absorbing the coloring liquid has been provided. The present inventors found that when a coloring material having the characteristics as described above was used as the coloring material for the coloring liquid, a light amount-adjusting member having almost constant spectral transmission characteristics at 400 to 700 nm, particularly at 600 nm to 700 nm, was easily obtained by using an ink-jet recording system or the like.

In the present invention, the coloring material having a maximum absorption wavelength in a range of from 630 to 750 nm is identified by the following method. First, coloring solutions of the following composition containing respective object coloring materials for measurement are prepared. Composition of coloring solution for measurement of maximum absorption wavelength of coloring material:

| | |
|---|---|
| Ethylene glycol | 10 parts |
| 2-Propanol | 5 parts |
| Test coloring material | 3 parts |
| Water | 82 parts. |

Each of the coloring solutions is then charged into an ink tank of, for example, a thermal type ink jet printer utilizing an electrothermal converter as an energy-generating element (BJS600, trade name, manufactured by Canon Inc.), and applied to a transparent base material to be used in formation of the light amount-adjusting member, preferably, a transparent base material having a receiving layer for absorbing the coloring liquid, so as to provide an even density, forming a solid image of 3 cm by 1 cm in size. Then, an absorption spectrum of the solid image thus obtained is measured by a spectrophotometer for ultraviolet-visible region (U-3300, trade name, manufactured by Hitachi Ltd.) to determine the maximum absorption wavelength.

Coloring materials having the above properties will hereinafter be described. Various dyes and pigments, including carbon black, may be used as the coloring material. The inventors have also identified C.I. Direct Black 168, compounds having a phthalocyanine skeleton represented by the following general formula (1), and compounds having a cyanine skeleton represented by the following general formula (2) to be preferred. These coloring materials are preferred because the resulting colored portion of the light amount-adjusting member can attenuate light in a near infrared region. Consequently, these materials can provide a member with an almost constant spectral transmittance over a wavelength range from 400 to 700 nm. It is important to use plural kinds of coloring materials in combination for forming a colored portion having an almost constant spectral transmittance over a wavelength range from 400 to 700 nm. More specifically, a coloring material for attenuating light in a short to medium wavelength range and a coloring material for attenuating light in a long wavelength range are used in combination to obtain an even spectral transmittance. Preferred coloring materials for attenuating the light in a long wavelength range are C.I. Direct Black 168, compounds represented by the following general formula (1) having a phthalocyanine skeleton, and compounds represented by the following general formula (2) having a cyanine skeleton.

General Formula (1):

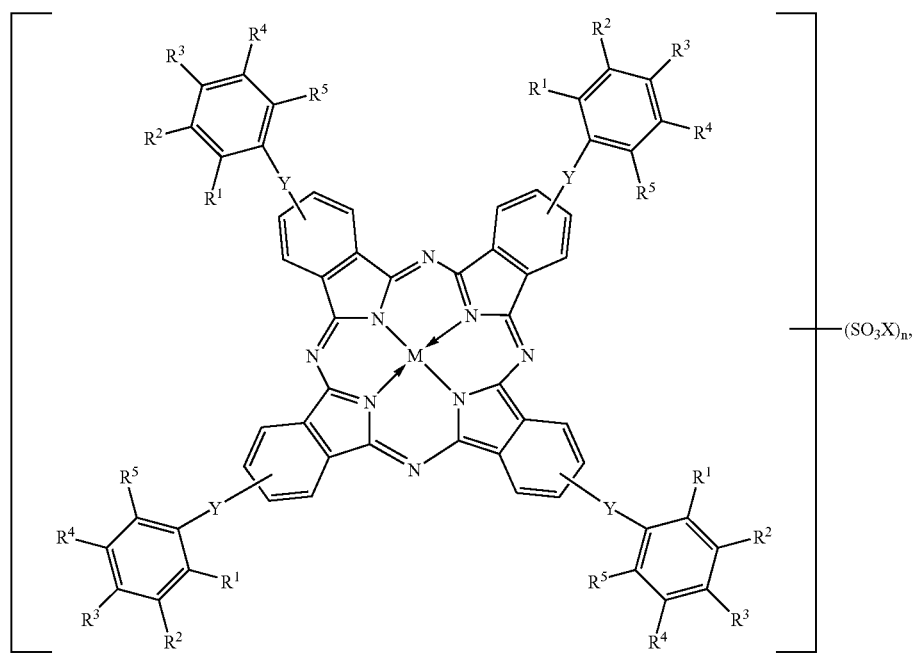

wherein Y is O or S, $R^1$, $R^2$, $R^3$, $R^4$ and $R^5$ are the same or different, and independently selected from the group consisting of hydrogen, halogen, a linear, branched or cyclic alkyl group having 1 to 8 carbon atoms, a linear, branched or cyclic alkoxy group having 1 to 8 carbon atoms, a linear or branched hydroxyalkyl group having 1 to 8 carbon atoms, a sulfone group, a sulfonamide group, a carboxyl group, a hydroxyl group, a cyano group, a nitro group, an amino group, a phosphono group, a trifluoromethyl group, $-NR^6_R{}^7$ wherein $R^6$ and $R^7$ are, independently, hydrogen or an alkyl group having 1 to 8 carbon atoms, $-NHCOCH_3$, $-NHCOCH_2OH$, $-NHCOC_6H_5$, a substituted or not substituted phenyl group, a substituted or not substituted naphthyl group, a substituted or not substituted phenoxy group, and a substituted or not substituted thiophenoxy group; M is a selected from the group consisting of a non-metal, metal, metal oxide or metal halide; X is hydrogen, an alkali metal, ammonium or an organic ammonium; and n is an integer of 1 to 20.

General Formula (2):

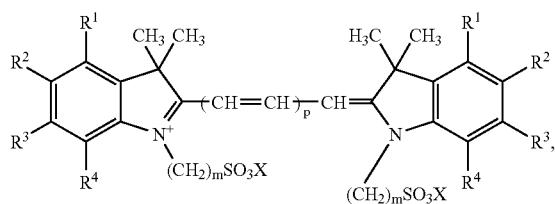

wherein $R^1$, $R^2$, $R^3$ and $R^4$ are the same or different, and independently, selected from the group consisting of hydrogen, an alkyl group having 1 to 8 carbon atoms, an alkoxy group having 1 to 8 carbon atoms, a hydroxyalkyl group having 1 to 8 carbon atoms, a substituted or not substituted phenyl group, a sulfone group, a carboxyl group, an amino group, $-NR^6R^7$, wherein $R^6$ and $R^7$ are, independently, hydrogen or an alkyl group having 1 to 8 carbon atoms, $-NHCOCH_3$, $-NHCOCH_2OH$, $-NHCOC_6H_5$ and halogen; X is selected from the group consisting of hydrogen, an alkali metal, ammonium and an organic ammonium and m and p are integers of 1 to 10.

The compounds represented by the general formula (1) and the compounds represented by the general formula (2) will hereinafter be described in detail. Specific examples of the linear, branched or cyclic alkyl groups having 1 to 8 carbon atoms in the general formulae (1) and (2) include methyl, ethyl, n-propyl, isopropyl, n-butyl, isobutyl, sec-butyl, tert-butyl, n-pentyl, isopentyl, neopentyl, 1,2-dimethylpropyl, n-hexyl, cyclohexyl, 1,3-dimethylbutyl, 1-isopropylpropyl, 1,2-dimethylbutyl, n-heptyl, 1,4-dimethylpentyl, 2-methyl-1-isopropylpropyl, 1-ethyl-3-methylbutyl, n-octyl and 2-ethylhexyl groups.

Specific examples of the linear, branched or cyclic alkoxy groups having 1 to 8 carbon atoms in the general formulae (1) and (2) include methoxy, ethoxy, n-propoxy, isopropoxy, n-butoxy, isobutoxy, sec-butoxy, tert-butoxy, n-pentyloxy, isopentyloxy, neopentyloxy, 1,2-dimethyl-propoxy, n-hexyloxy, cyclohexyloxy, 1,3-dimethylbutoxy and 1-isopropylpropoxy groups.

The $-NR^6R^7$ group in the general formulae (1) and (2) may be an alkylamino group with an alkyl portion having 1 to 8 carbon atoms. Specific examples thereof include methylamino, ethylamino, n-propylamino, n-butylamino, sec-butylamino, n-pentylamino, n-hexylamino, n-heptylamino, n-octylamino and 2-ethylhexylamino groups.

In the phenyl group in the general formula (2), examples of the possible substituents include halogen atoms, and acyl, alkyl, alkoxy, halogenated alkyl, halogenated alkoxy, nitro, amino, alkylamino, alkylcarbonylamino, arylamino, arylcarbonylamino, carbonyl and alkoxycarbonyl groups. However, the substituents are not limited thereto.

Specific examples of the substituent of the phenyl group, the naphthyl group, the phenoxy group and the thiophenoxy group in the general formula (1) may be halogen atoms, linear or branched alkyl groups having 1 to 8 carbon atoms, linear or branched alkoxy groups having 1 to 8 carbon atoms, linear or branched hydroxyalkyl groups having 1 to 8 carbon atoms, a sulfone group, a sulfonamide group, a carboxyl group, a hydroxyl group, a cyano group, a nitro group, an amino group, a phosphono group, a trifluoromethyl group, —$NR^6R^7$, where $R^6$ and $R^7$ are, independently, hydrogen or an alkyl group having 1 to 8 carbon atoms, with the proviso that the alkylamino group with an alkyl portion having 1 to 8 carbon atoms is as described above, —$NHCOCH_3$, —$NHCOCH_2OH$, and —$NHCOC_6H_5$.

M in the general formula (1) represents a non-metal atom, metal, metal oxide or metal halide. M is, for example, two hydrogen atoms. Examples of the metal include iron, magnesium, nickel, cobalt, copper, palladium, zinc, vanadium, titanium, indium and tin. Examples of the metal oxide include titanyl and vanadyl. Examples of the metal halide include aluminum chloride, indium chloride, germanium chloride, tin chloride and silicon chloride. In the coloring material used in the present invention, it is preferred that M be a metal, metal oxide or metal halide, specifically, copper, zinc, cobalt, nickel, iron, vanadyl, titanyl, indium chloride or tin dichloride. Among these, a coloring material in which M is copper, zinc, cobalt, vanadyl or tin dichloride, is preferably used. A coloring material, in which M is zinc, cobalt, vanadyl or tin dichloride, is more preferably used.

X in the general formula (1) or (2) is hydrogen, an alkali metal, ammonium or an organic ammonium. This X will now be described. The alkali metal is preferably lithium, sodium or potassium. Examples of the organic ammonium include triethanolamonium, diethanolammonium, monoethanolammonium, diisopropanolammonium, triisopropanolammonium, tetramethylammonium, tetraethylammonium and tetra-n-propylammonium.

Specific preferable examples of the compounds represented by the general formula (1) used as the coloring material for the coloring liquid are mentioned below.

Exemplified Compound 1

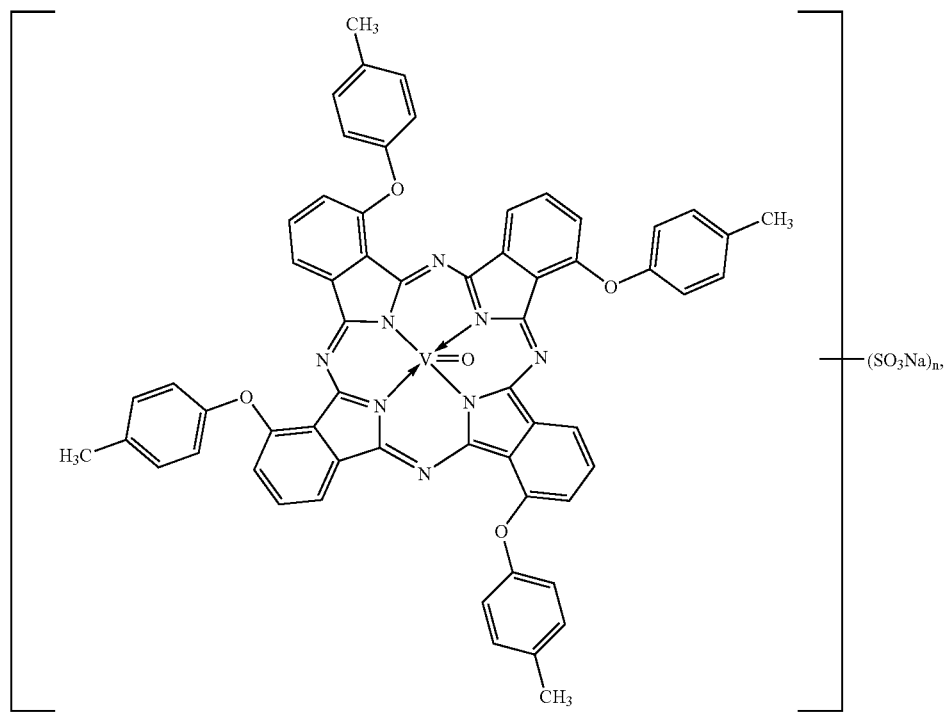

wherein n is an integer of 1 to 10.

Exemplified Compound 2
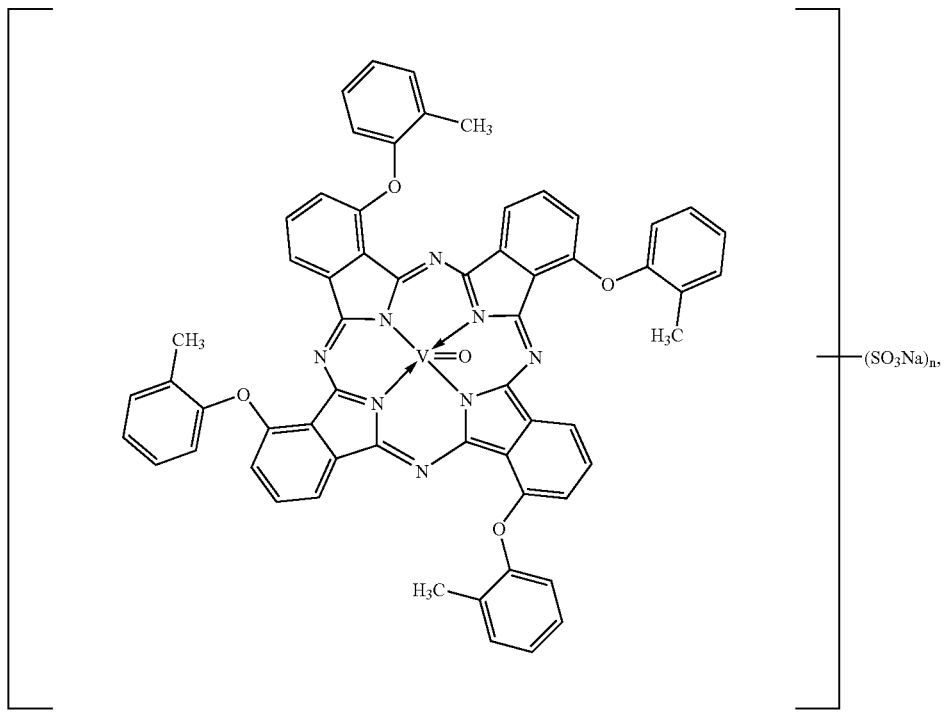
wherein n is an integer of 1 to 10.
Exemplified Compound 3
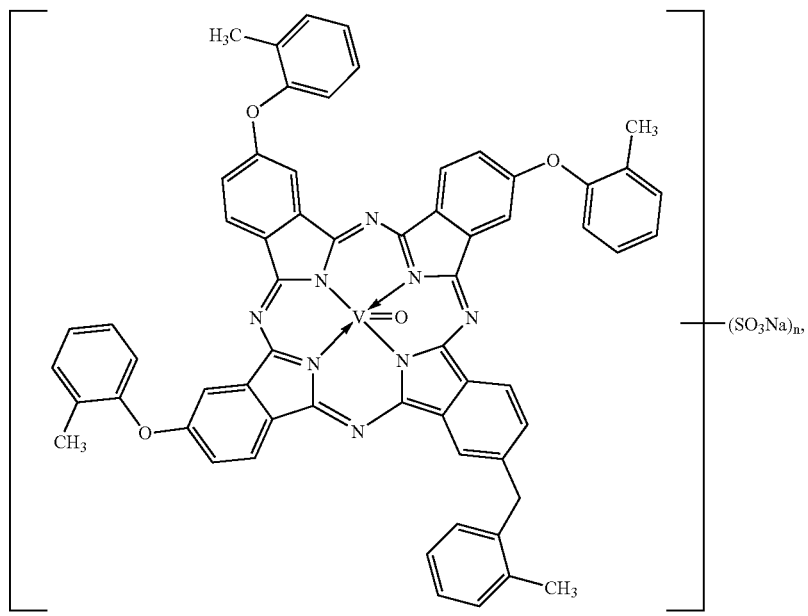
wherein n is an integer of 1 to 10.

Exemplified Compound 4
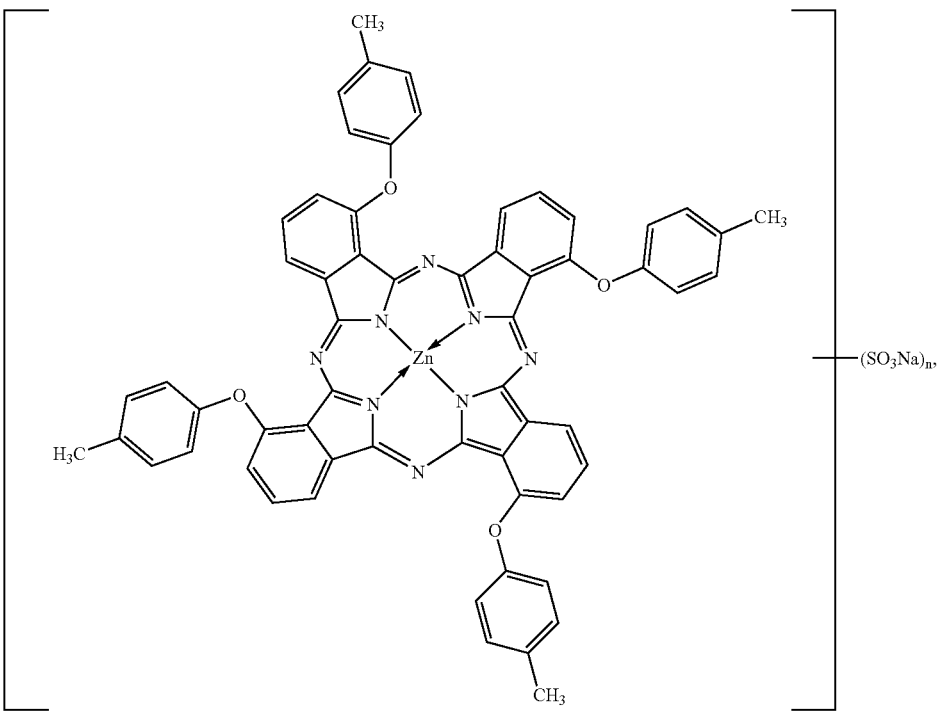
wherein n is an integer of 1 to 10.
Exemplified Compound 5
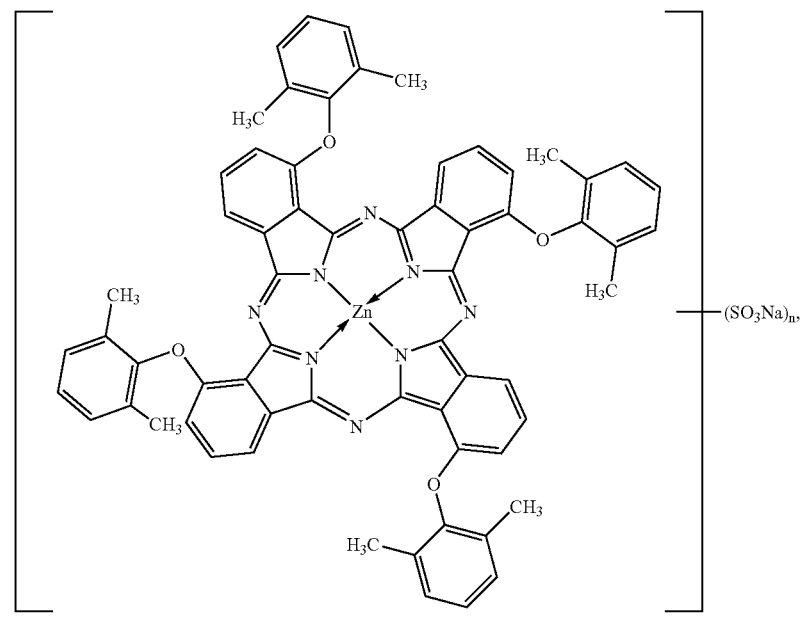
wherein n is an integer of 1 to 10.-

Specific preferable examples of the compounds represented by the general formula (2) used as the coloring material for the coloring liquid are mentioned below.

Exemplified Compound 6

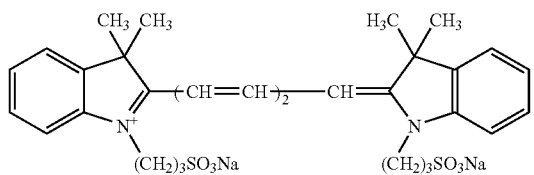

Exemplified Compound 7

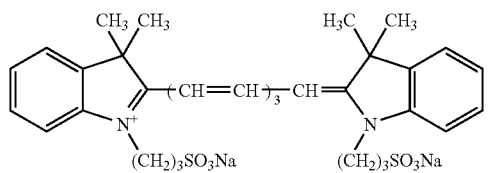

One of the features of the present invention is the use of a coloring liquid containing a coloring material of having a maximum absorption wavelength of 630 to 750 nm when measured on a transparent base material, which preferably has a receiving layer to absorb the coloring liquid. As the coloring materials having such properties, one or more selected from C.I. Direct Black 168, compounds represented by the general formula (1) having a phthalocyanine skeleton, and compounds represented by the general formula (2) having a cyanine skeleton are preferably used. Among these coloring materials with the maximum absorption wavelength of 630 to 750 nm, a combination of C.I. Direct Black 168 with any one of Exemplified Compounds 1, 2, 4 and 5 can provide more constant spectral characteristics in 400 to 750 nm.

When such coloring materials as mentioned above are suitably used to produce an ND filter, it is preferable to formulate the coloring liquid with a plurality of other coloring materials, such as dyes, pigments and carbon black, in addition to the above coloring materials to form a colored portion on a transparent base material or a receiving layer formed on the surface of the transparent base material to absorb the coloring liquid, so that the spectral transmittance in the colored portion becomes almost constant in a visible light range (400 to 700 nm).

No particular limitation is imposed on the concentration of these dyes and pigments. However, they are used within a range of 0.05 to 20% by mass based on the total mass of the coloring liquid.

As the dyes for toning, all dyes may be used, such as, for example, direct dyes, acid dyes, basic dyes and disperse dyes. Specific examples thereof include:

C.I. Direct Black 4, 9, 11, 17, 19, 22, 32, 80, 151, 154, 171, 194 and 195;

C.I. Direct Blue 1, 2, 6, 8, 22, 34, 70, 71, 76, 78, 86, 142, 199, 200, 201, 202, 203, 207, 218, 236 and 287;

C.I. Direct Red 1, 2, 4, 8, 9, 11, 13, 15, 20, 28, 31, 33, 37, 39, 51, 59, 62, 63, 73, 75, 80, 81, 83, 87, 90, 94, 95, 99, 101, 110, 189, 225 and 227;

C.I. Direct Yellow 1, 2, 4, 8, 11, 12, 26, 27, 28, 33, 34, 41, 44, 48, 86, 87, 88, 132, 135, 142, 144 and 173;

C.I. Food Black 1 and 2;

C.I. Acid Black 1, 2, 7, 16, 24, 26, 28, 31, 48, 52, 63, 107, 112, 118, 119, 121, 172, 194 and 208;

C.I. Acid Blue 1, 7, 9, 15, 22, 23, 27, 29, 40, 43, 56, 59, 62, 78, 80, 81, 90, 102, 104, 111, 185 and 254;

C.I. Acid Red 1, 4, 8, 13, 14, 15, 18, 21, 26, 35, 37, 52, 249, 257, 289 and 315;

C.I. Acid Yellow 1, 3, 4, 7, 11, 12, 13, 14, 19, 23, 25, 34, 38, 41, 42, 44, 53, 55, 61, 71, 76, 79 and 121;

C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44 and 46;

C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, 64 and 180;

C.I. Reactive Yellow 1, 2, 3, 4, 6, 7, 11, 12, 13, 14, 15, 16, 17, 18, 22, 23, 24, 25, 26, 27, 37 and 42;

C.I. Reactive Black 1, 3, 4, 5, 6, 8, 9, 10, 12, 13, 14 and 18; and

Projet Fast Cyan 2 (trade name, product of Zeneca Co.), Projet Fast Magenta 2 (trade name, product of Zeneca Co.), Projet Fast Yellow 2 (trade name, product of Zeneca Co.) and Projet Fast Black 2 (trade name, product of Zeneca Co.). However, the dyes are not limited thereto.

As the pigments for toning, all pigments may be used, such as, for example, inorganic pigments and organic pigments. Specific examples thereof include:

Carbon black;

C.I. Pigment Yellow 1, 2, 3, 12, 13, 14, 16, 17, 73, 74, 75, 83, 93, 95, 97, 98, 114, 128, 129, 151, 154 and 195;

C.I. Pigment Red 5, 7, 12, 48(Ca), 48(Mn), 57(Ca), 57:1, 57(Sr), 60, 112, 122, 123, 168, 184 and 202;

C.I. Pigment Blue 1, 2, 3, 15:3, 15:34, 16, 22 and 60; and

C.I. Vat Blue 4 and 6. However, the pigments are not limited thereto.

In the case where the pigments as mentioned above are used as coloring materials for toning the coloring liquid in the present invention, it is preferable to use a dispersing agent in combination with the pigments for stably dispersing the pigments in the coloring liquid. As the dispersing agent, a polymer dispersing agent, a surfactant type dispersing agent or the like may be used. Specific examples of the polymeric dispersing agent include polyacrylic acid salts, styrene-acrylic acid copolymer salts, styrene-methacrylic acid copolymer salts, styrene-acrylic acid-acrylic ester terpolymer salts, styrene-maleic acid copolymer salts, acrylic ester-maleic acid copolymer salts, styrene-methacrylsulfonic acid copolymer salts, vinylnaphthalene-maleic acid copolymer salts, β-naphthalenesulfonic acid-formalin condensate salts, polyvinyl pyrrolidone, polyethylene glycol and polyvinyl alcohol. The above-recited compounds that have a weight average molecular weight of 1,000 to 30,000 and an acid value ranging from 100 to 430 are preferably used.

Examples of the surfactant-type dispersing agent include laurylbenzenesulfonic acid salts, laurylsulfonic acid salts, laurylbenzenecarboxylic acid salts, laurylnaphthalenesulfonic acid salts, aliphatic amine salts and polyethylene oxide condensates. All of these surfactants may be used. The amount of these dispersing agents used is preferably within a range of 10:5 to 10:0.5 in terms of a ratio of the mass of the pigments used to the mass of the dispersing agents used.

In the present invention, self-dispersing carbon black pigments as described, for example, in Japanese Patent Application Laid-Open Nos. H5-186704 and H8-3498, which can be self-dispersed by introducing a water-soluble group into the surface of carbon black, may also be used as coloring materials for toning. When such self-dispersing carbon black is used, it is not always necessary to use a dispersing agent mentioned above.

The coloring liquid used in the present invention is prepared by dissolving or dispersing the above-described coloring material(s) in a liquid medium. The liquid medium used in this case will be described below. In the present invention, a mixed solvent of water and a water-soluble organic solvent is preferably used as the liquid medium for the coloring liquid. Deionized water is desirably used in lieu of tap water containing various ions. The content of water is preferably within a range of 35 to 96% by mass based on the total mass of the coloring liquid.

The water-soluble organic solvent used in combination with water may be suitably selected from among the water-soluble organic solvents mentioned below in accordance with the purpose of use. In that connection, the water-soluble organic solvent is used for various purposes, for example, for modifying the viscosity of the resulting coloring liquid, slowing the drying speed of the coloring liquid, and improving the solubility of the coloring material(s) to prevent clogging at an orifice of a recording head.

Examples of the water-soluble organic solvent include ethylene glycol, diethylene glycol, triethylene glycol, tripropylene glycol, glycerol, 1,2,4-butanetriol, 1,2,6-hexanetriol, 1,2,5-pentanetriol, 1,2-butanediol, 1,3-butanediol, 1,4-butanediol, dimethyl sulfoxide, diacetone alcohol, glycerol monoallyl ether, propylene glycol, butylene glycol, polyethylene glycol 300, thiodiglycol, N-methyl-2-pyrrolidone, 2-pyrrolidone, γ-butyrolactone, 1,3-dimethyl-2-imidazolidinone, sulfolane, trimethylolpropane, trimethylolethane, neopentyl glycol, ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether, dipropylene glycol monomethyl ether, β-dihydroxyethylurea, urea, acetonylacetone, pentaerythritol, 1,4-cyclohexanediol, hexylene glycol, ethylene glycol monopropyl ether, ethylene glycol monobutyl ether, ethylene glycol monoisobutyl ether, ethylene glycol monophenyl ether, diethylene glycol diethyl ether, diethylene glycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, glycerol monoacetate, glycerol diacetate, glycerol triacetate, ethylene glycol monomethyl ether acetate, diethylene glycol monomethyl ether acetate, cyclohexanol, 1,2-cyclohexanediol, 1-butanol, 3-methyl-1,5-pentanediol, 3-hexene-2,5-diol, 2,3-butanediol, 1,5-pentanediol, 2,4-pentanediol, 2,5-hexanediol, ethanol, n-propanol, 2-propanol, 1-methoxy-2-propanol, furfuryl alcohol and tetrahydrofurfuryl alcohol.

The overall amount of the water-soluble solvent used in the coloring liquid is preferably within a range of, generally, 5 to 40% by mass based on the total mass of the coloring liquid. Such water-soluble organic solvents may be used either singly or in any combination thereof. In addition to the above-described components, for example, viscosity modifiers, mildew-proofing agents, preservatives, antioxidants, antifoaming agents, surfactants and anti-drying agents composed of urea or the like, which are conventionally known general additives, may be suitably used in the coloring liquid in the present invention in combination as needed.

In the production process of the light amount-adjusting member according to the present invention, the coloring liquid obtained in the above-described manner is ejected on the transparent base material to apply the coloring liquid to the base material, thereby forming a colored portion of a predetermined optical density. A transparent liquid is ejected on a non-colored portion as needed.

The transparent base material used in the above process will be described below. No particular limitation is imposed on the transparent base material usable in the present invention, as long as it has the necessary properties, such as mechanical strength and optical properties, to function as part of a light amount-adjusting member. For example, transparent film base materials composed of polyethylene terephthalate, diacetate, triacetate, cellophane, celluloid, polycarbonate, polyimide, polyvinyl chloride, polyvinylidene chloride, polyacrylate, polyethylene, polypropylene or the like may be used. A glass base material may also be used, as long as it has the above-described necessary properties. In the present invention, a receiving layer to absorb the coloring liquid is preferably formed on the surface of the transparent base material.

The receiving layer for the coloring liquid formed on the surface of a transparent base material mentioned above will hereinafter be described. No particular limitation is imposed on a material for receiving the coloring liquid used for forming a colored portion, so long as it absorbs the coloring liquid and can receive and fix the coloring material in the coloring liquid in the layer. For example, water-soluble resins and water-dispersing resins such as those mentioned below may be used.

Examples of the water-soluble resins usable in the formation of the receiving layer for the coloring liquid include synthetic resins, such as polyvinyl alcohol and a modified product of polyvinyl alcohol, such as an anionically modified polyvinyl alcohol, a cationically modified polyvinyl alcohol and an acetal-modified polyvinyl alcohol; hydrophilic polyurethane; polyvinyl pyrrolidone; modified products of polyvinylpyrrolidone, such as vinylpyrrolidone-vinyl acetate copolymers, vinylpyrrolidone-dimethylaminoethyl methacrylate copolymers, quaternized vinylpyrrolidone-dimethylaminoethyl methacrylate copolymers and vinylpyrrolidone-methacrylamidopropyltrimethylammonium chloride copolymers; cellulosic water-soluble resins, such as carboxymethyl cellulose, hydroxyethyl cellulose and hydroxypropyl cellulose; modified products of cellulose, such as cationic hydroxyethyl cellulose; polyester, polyacrylic acid (esters), melamine resins and modified products thereof; and graft copolymers containing at least a polyester and a polyurethane; and natural resins, such as albumin, gelatin, casein, starch, cationic starch, gum arabic and sodium alginate.

Examples of the water-dispersing resin usable in the formation of the receiving layer for the coloring liquid include a large number of resins, such as polyvinyl acetate, ethylene-vinyl acetate copolymers, polystyrene, styrene-(meth)acrylic ester copolymers, (meth)acrylic ester polymers, vinyl acetate-(meth)acrylic acid (ester) copolymers, poly(meth)acrylamide, (meth)acrylamide copolymers, styrene-isoprene copolymers, styrene-butadiene copolymers, styrene-propylene copolymers, poly(vinyl ether) and silicone-acrylic copolymers. The present invention is not limited to such materials.

When a coating film is provided with a coating formulation containing alumina hydrate, amorphous silica or the like, in addition to the above-described resin, pores (voids among fine particles of alumina or amorphous silica) are formed in the coating film. Accordingly, a receiving layer that absorbs the coloring liquid into the voids can be obtained.

In order, for example, to control the coating ability and coloring liquid-absorbing performance of the receiving layer for the coloring liquid formed on the transparent base material and to improve mechanical properties thereof, various kinds of surfactants, cross-linking agents, dye-fixing agents (water-proofing agents), antifoaming agents, antioxidants, viscosity modifiers, pH adjustors, mildew-proofing agents and plasticizers, and the like, may be contained in the materials for the coating formulation used in the formation of the receiving layer for the coloring liquid.

The formation of the receiving layer for the coloring liquid on the transparent base material is conducted, for example, in the following manner. A suitable material capable of receiving the coloring liquid is first dissolved or dispersed in water, an alcohol, a polyhydric alcohol or any proper other organic solvent together with various additives added as needed, thereby preparing a coating formulation. The resultant coating formulation is then applied to the surface of the base material Ψ by a coating process, such as roll coating, a blade coating, air-knife coating, gate roll coating, bar coating, size press coating, spray coating, gravure coating, curtain coating or spin coating process. The coating formulation thus applied is then dried by means of, for example, a hot air drying oven, heated drum, hot plate, or the like, to form a receiving layer for the coloring liquid.

In the production process of the light amount-adjusting member according to the present invention, the coloring liquid structured as described above is ejected onto the transparent base material while scanning an ink-jet head relatively to the transparent base material to form a desired light amount-adjusting region. The process for forming such a light amount-adjusting region will hereinafter be described.

In the production process of the light amount-adjusting member according to the present invention, the coloring liquid composed of the above-described materials is applied onto the transparent base material, preferably, the transparent base material on which the receiving layer has been formed, using an ink-jet method to form a colored portion composed of a desired light amount-adjusting region. In this case, the coloring liquid-applying system may be a thermal type ink-jet head that utilizes an electrothermal converter as an energy-generating element or a piezo type ink-jet head that utilizes a piezoelectric element.

When it is necessary to change the amount of the coloring liquid ejected as described below, the piezo type ink-jet head, using which the ejecting amount can be changed relatively easily, is preferably used. A commercially available ink-jet printer may be used an apparatus for applying the coloring liquid by driving this recording head. In this case, however, color conversion and gamma correction processing conducted by a printer driver need to be considered. Accordingly, the application of the coloring liquid is preferably conducted by a special printing apparatus coping with ejecting conditions or the like desired in the present invention if possible.

In the present invention, the ejection of the coloring liquid from the above-described ink-jet head is suitably controlled so as to provide a light amount-adjusting region of a uniform light amount-adjusting function (uniform density), or a light amount-adjusting region of a gradient density, that is, varying light amount-adjusting function continuously or in a step-wise manner. In particular, according to the production process of the present invention, a light amount-adjusting member having a density gradient can also be simply produced by the same process as that used to provide a light amount-adjusting member having a uniform density. In this regard, the production process of a light amount-adjusting member according to the present invention is substantially different from the conventionally used vapor deposition process or the like and is also advantageous from the viewpoint of production.

The transparent region can be formed without applying any liquid. However, it is desirable that a transparent liquid is applied to the transparent portion in order to avoid the change in optical properties caused by a minute level difference caused by the presence or absence of liquid application. The liquid medium used in the transparent liquid is preferably the same liquid medium as that used in the coloring liquid.

The desired condition of the light amount-adjusting region formed by applying the coloring liquid in the above-described manner can achieved by controlling, for example, the amount of the coloring liquid ejected from the ink-jet head, an ejection position, the kind of the coloring liquid used, the number of dots of the coloring liquid, and the like. For example, when an ND filter having a density gradient is produced, it is only necessary to suitably control the kind and number of the coloring liquid ejected from the ink-jet head, or a recording pitch and the amount of the coloring liquid ejected.

After the coloring liquid is applied on to the transparent base material in the above-described manner, the coloring liquid thus applied may be dried by means of a hot air drying oven, heated drum, hot plate, or the like, as needed. In particular, when a cross-linking agent is mixed into the material for forming the receiving layer, it is effective to cure a coating by heating or light irradiation.

In the production process of the light amount-adjusting member according to the present invention, after the coloring liquid is applied to the transparent base material having the receiving layer for the coloring liquid in the above-described manner to form the light amount-adjusting region, a transparent layer may also be provided on the colored portion for a leveling treatment. The transparent leveling layer is provided for the purpose of preventing light scattering by the coloring liquid on the surface or inside of the receiving layer. A material having an almost the same refractive index as the material of the receiving layer is preferably used for the transparent leveling layer with. When a difference in the refractive index between these materials is large, a scattering component of the resulting light amount-adjusting member is increased due to the reflection at an interface between the receiving layer and the leveling layer.

Accordingly, preferable materials for the transparent leveling layer are selected from those mentioned above as being capable of receiving the coloring liquid, having good adhesiveness to the receiving layer, satisfactory mechanical strength and optical properties, and can be laminated on the receiving layer for the coloring liquid. However, the present invention is not limited thereto. The formation of the transparent leveling layer using a coating formulation containing such a material can also be conducted by a process such as roll coating, blade coating, air-knife coating, gate roll coating, bar coating, size press coating, spray coating, gravure coating, curtain coating or spin coating. After the coating is formed, it is also preferable to dry it using, for example, a hot air drying oven, heated drum, hot plate, or the like, to form the transparent leveling layer.

When the transparent base material has an above-described void-absorption type receiving layer containing particles of alumina or the like to absorb the coloring liquid in voids among the particles, a liquid material, such as silicone oil or a fatty acid ester, may be applied to fill the voids after the coloring liquid is applied. In this case, it is preferred that a transparent leveling layer is formed by the same process as that described above to cover the surface of the colored portion for the purpose of preventing the coloring liquid from running out of the receiving layer.

In the production process of the light amount-adjusting member according to the present invention, an inorganic coating may also be further vapor-deposited on the above-described transparent leveling layer and the transparent base material to form an anti-reflection coating for the purpose of improving optical properties. The anti-reflection coating formed in this case is required to have excellent anti-reflection properties in a visible light band and excellent barrier properties with respect to water and harmful gasses. In order to satisfy these requirements, vapor deposited multi-layer films composed of inorganic materials are suitably used. For example, the anti-reflection coatings described in Japanese Patent Application Laid-Open No.

H6-273601 may be formed to prevent stray light due surface reflection of the filter, and, moreover, to stop the penetration of water and harmful gasses into the coloring material to prevent deterioration of the coloring material.

In the production process of the light amount-adjusting member according to the present invention, forming the above-described transparent leveling layer effectively overcome the problem of partial irregularities on the surface of the colored resin coating that is the colored portion formed in the above-described manner. However, a process in which the surface of the colored portion is subjected to a polishing treatment to make the surface flat may also be suitably used. Exemplary polishing methods include tape polishing and buffing. In the present invention, buffing is particularly suitable. Buffing is a method in which a polishing agent is provided on the surface of a polishing base, and a portion to be polished is brought into contact with the polishing base while the polishing base is rotated, thereby polishing the surface layer of the base material by the polishing agent.

The optical advantage in the case where the optical density of the light amount-adjusting member is varied continuously or in a step-wise manner is described in, for example, Japanese Patent Application Laid-Open Nos. H6-95208 and H11-15042. On the other hand, the investigation by the present inventors has revealed that when the light amount-adjusting member produced by the production process according to the present invention, the optical density of which varies step-wise or continuously, is applied to a diaphragm device, the same effects as those achieved by using conventionally made light amount-adjusting members can be obtained eve though the production process of the present invention is more simple.

Figure 1B:
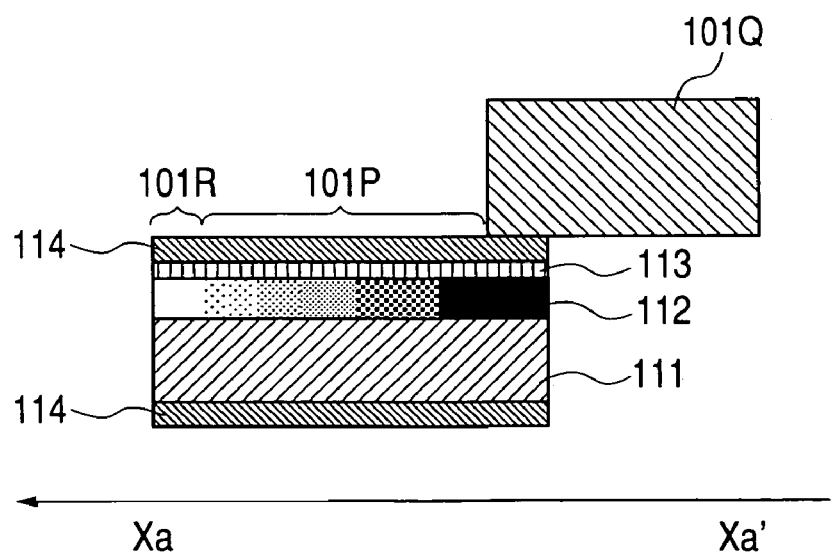
Figure 2:
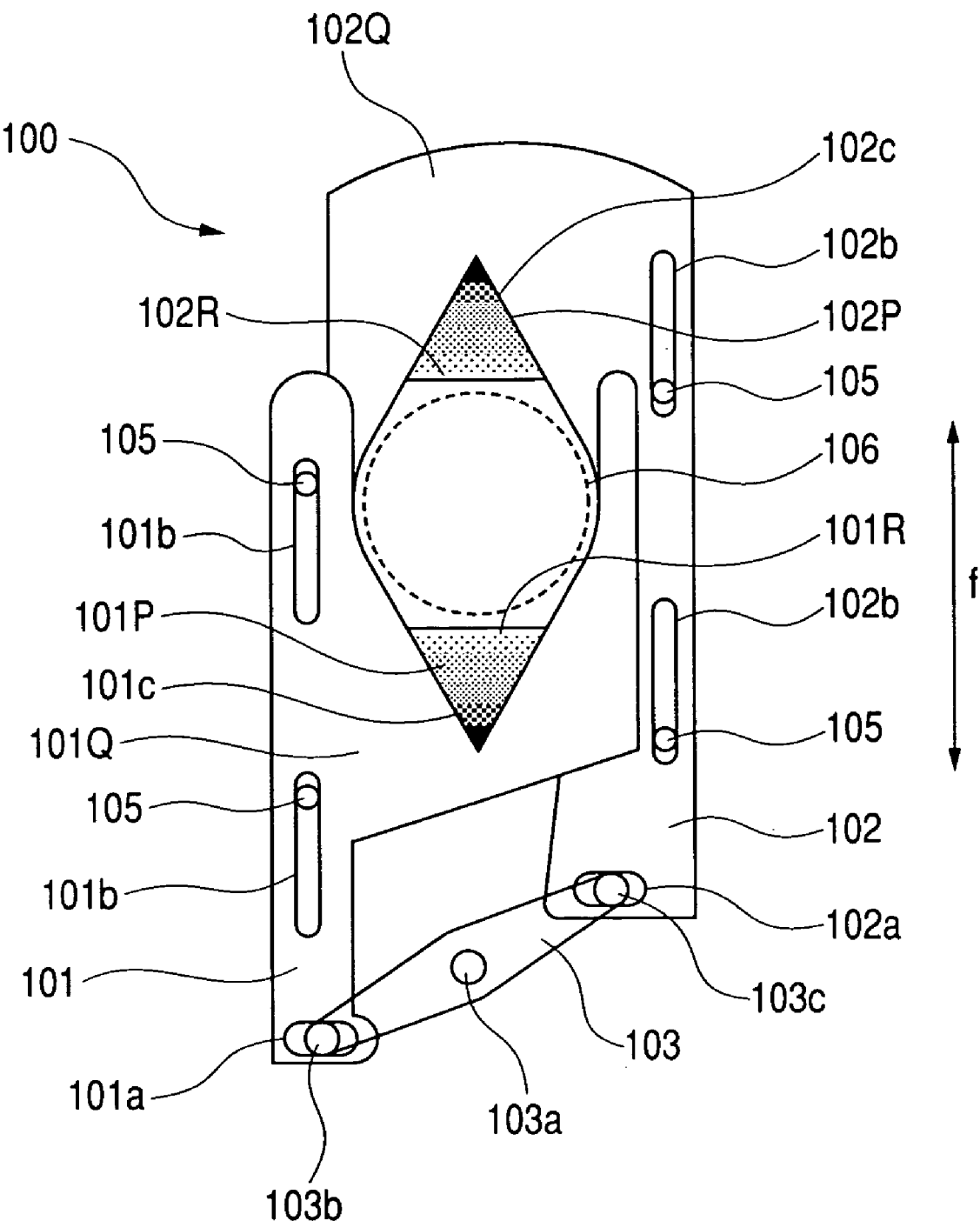
FIG. 2 schematically illustrates a light amount-adjusting device using two diaphragm blades shown in FIG. 1A.

A light amount-adjusting device using the light amount-adjusting member obtained by the production process according to the present invention will hereinafter be described. The present invention is not limited to the constitution described below. FIG. 1A illustrates a diaphragm blade having a light amount-adjusting member according to the present invention. Here, a diaphragm device used as a light amount-adjusting device in a video camera or the like will be described as an example. FIG. 1B is a cross-sectional view taken along the line 1B—1B in FIG. 1A. Reference numerical 101 in FIG. 1A indicates a diaphragm blade comprised of a colored portion 101p (gradation portion in FIG. 1A) composed of regions having predetermined optical densities formed in the above-described manner, a transparent portion 101R (portion adjacent to the gradation portion) for transmitting light, and a light interrupting member 101Q for interrupting light. In FIGS. 1A, 1B and 2, the light interrupting member 101Q is not colored for the purpose of making a boundary with the colored portion 101P clear. However, it is naturally colored black or the like, because it serves to interrupt light. In FIG. 1B, numeral 111 designates a transparent substrate, 112 a receiving layer for the coloring liquid, 113 a transparent leveling layer, and 114 a reflection-preventing film. The transparent portion 101R for transmitting light may be a space. However, the transparent portion 101R may also be formed by applying a transparent liquid having the same composition as the coloring liquid, except that no coloring material is contained to the transparent base material in the same manner as with the coloring liquid.

FIG. 2 illustrates a light amount-adjusting device using the diaphragm blade shown in FIGS. 1A and 1B. In FIG. 2, reference numeral 100 indicates the whole light amount-adjusting device. Reference numeral 101 is the first diaphragm blade shown in FIGS. 1A and 1B, and reference numeral 102 is the second diaphragm blade. The second diaphragm blade 102 is produced in the same process as the first diaphragm blade and has a colored portion 102P, a transparent portion 102R for transmitting light and a light interrupting member 102Q. Reference numeral 103 indicates a diaphragm-blade-driving lever that is fitted on a shaft of a motor (not illustrated) at a hole 103a and is rotated about the hole 103a. The first diaphragm blade 101 and second diaphragm blade 102 are engaged at the respective slots 101a and 102a with projected pins 103b and 103c provided at both ends of the diaphragm blade-driving lever 103. Reference numeral 105 indicates a guide pin for a bottom plate (not illustrated) that is relatively slidably engaged with respective grooves 101b and 102b at side edges of the first and second diaphragm blades 101 and 102, 106 an optical path hole provided through the bottom plate, 101c and 102c respective opening edges of the first and second diaphragm blades 101 and 102.

FIG. 2 illustrates a state in which the diaphragm has been fully opened. When the diaphragm is closed from the fully opened state, the optical path hole 106 that is an opening of the diaphragm is covered with the respective colored portions 101P and 102P of the first and second diaphragm blades, so that the transmittance of a beam passing through the optical path 106 is gradually reduced.

Figure 3:
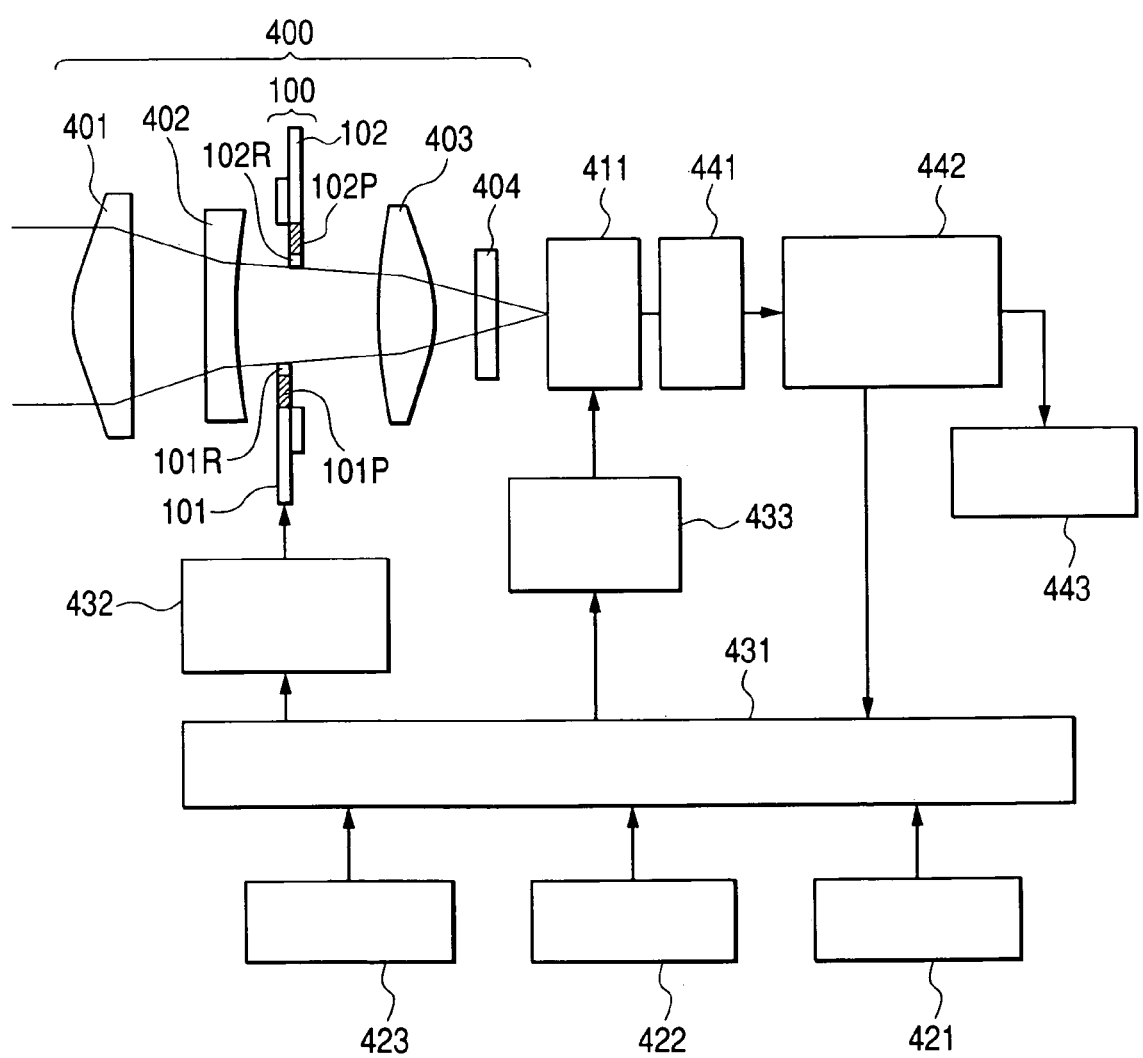
FIG. 3 diagrammatically illustrates the construction of a photographing apparatus into which the light amount-adjusting device shown in FIG. 2 has been incorporated.
Figure 4:
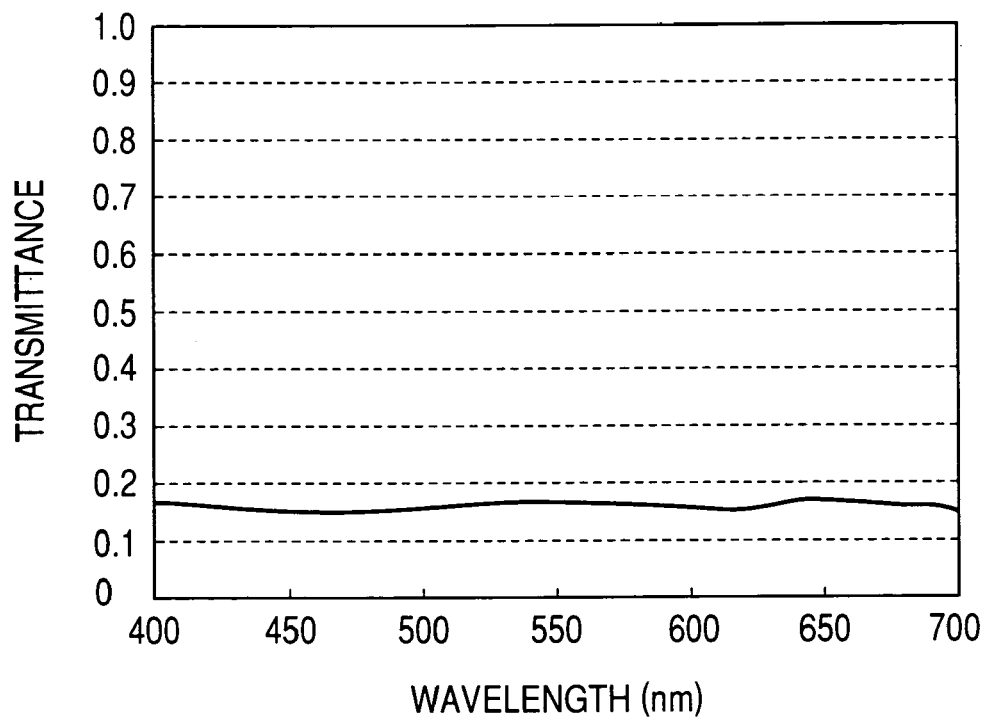
FIG. 4 illustrates a spectral transmittance of an ND filter obtained in EXAMPLE 1 at a portion having an optical density of about 0.8.
Figure 5:
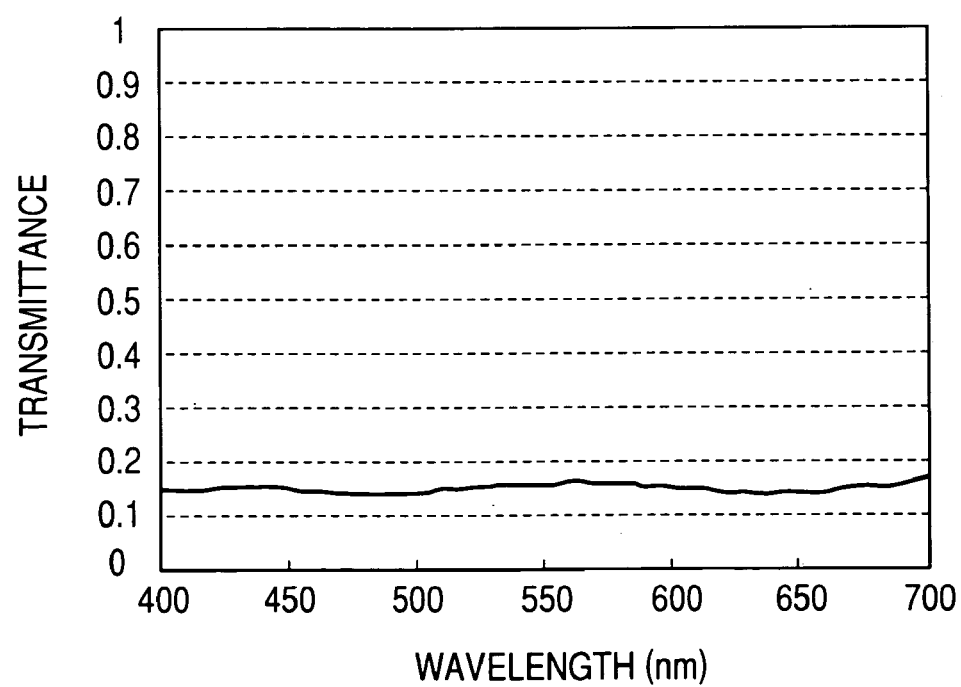
FIG. 5 illustrates a spectral transmittance of an ND filter obtained in EXAMPLE 2 at a portion having an optical density of about 0.8.
Figure 6:
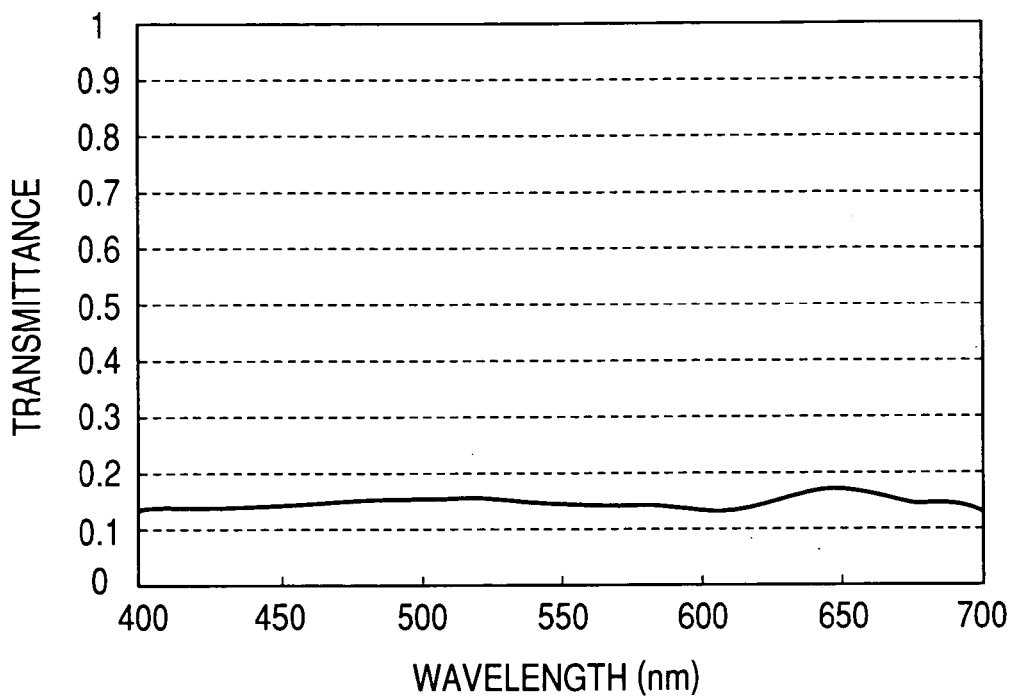
FIG. 6 illustrates a spectral transmittance of an ND filter obtained in EXAMPLE 3 at a portion having an optical density of about 0.8.
Figure 7:
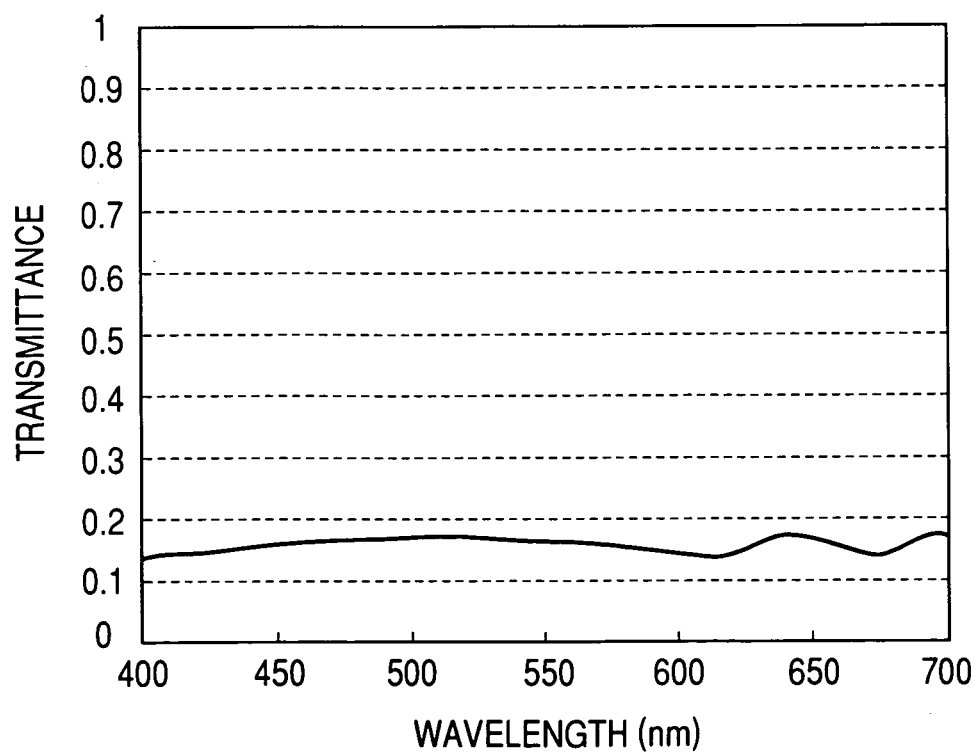
FIG. 7 illustrates a spectral transmittance of an ND filter obtained in EXAMPLE 4 at a portion having an optical density of about 0.8.
Figure 8:
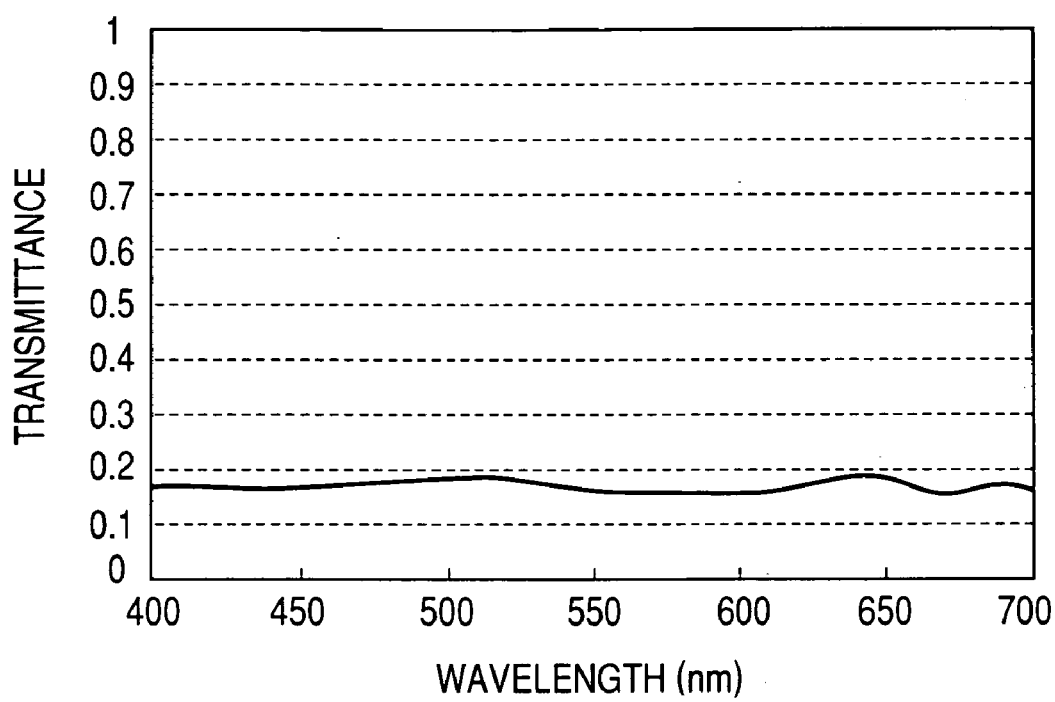
FIG. 8 illustrates a spectral transmittance of an ND filter obtained in EXAMPLE 5 at a portion having an optical density of about 0.8.
Figure 9:
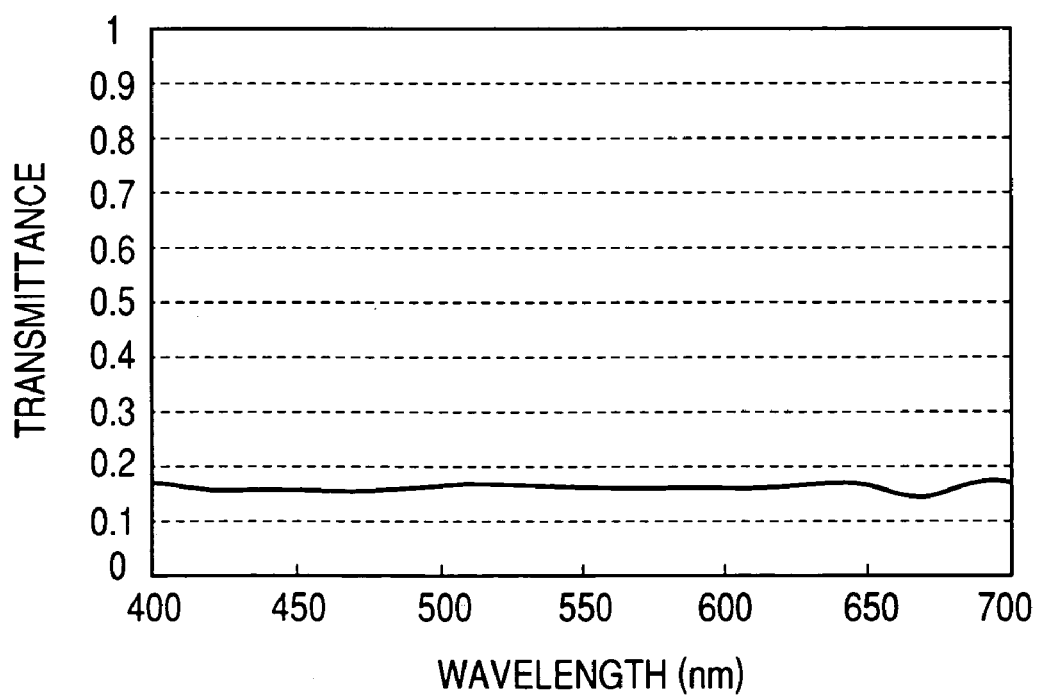
FIG. 9 illustrates a spectral transmittance of an ND filter obtained in EXAMPLE 6 at a portion having an optical density of about 0.8.
Figure 10:
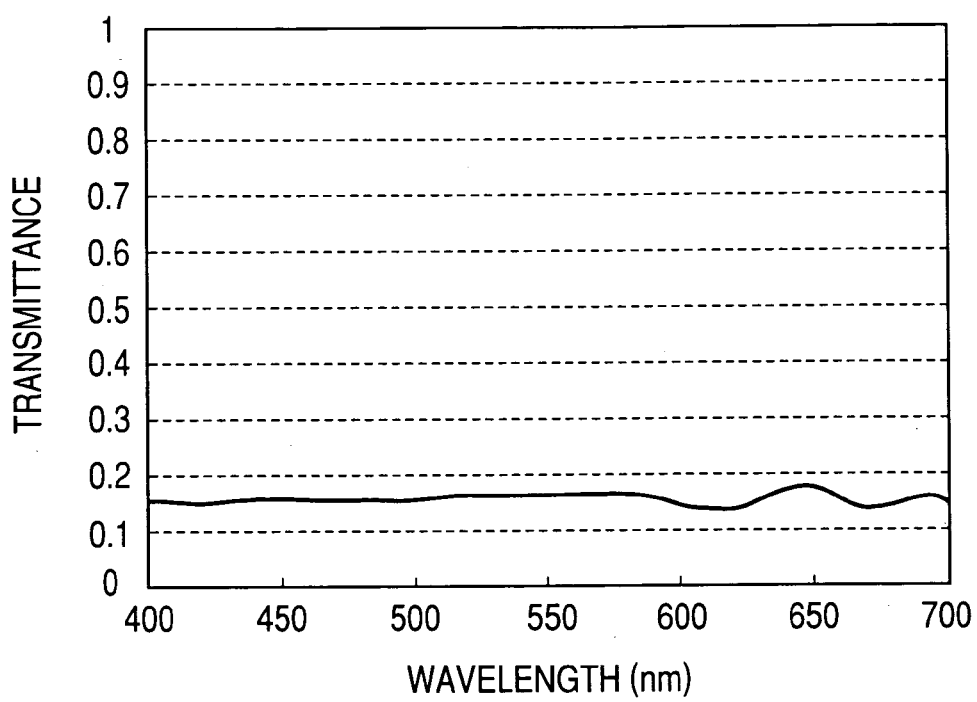
FIG. 10 illustrates a spectral transmittance of an ND filter obtained in EXAMPLE 7 at a portion having an optical density of about 0.8.
Figure 11:
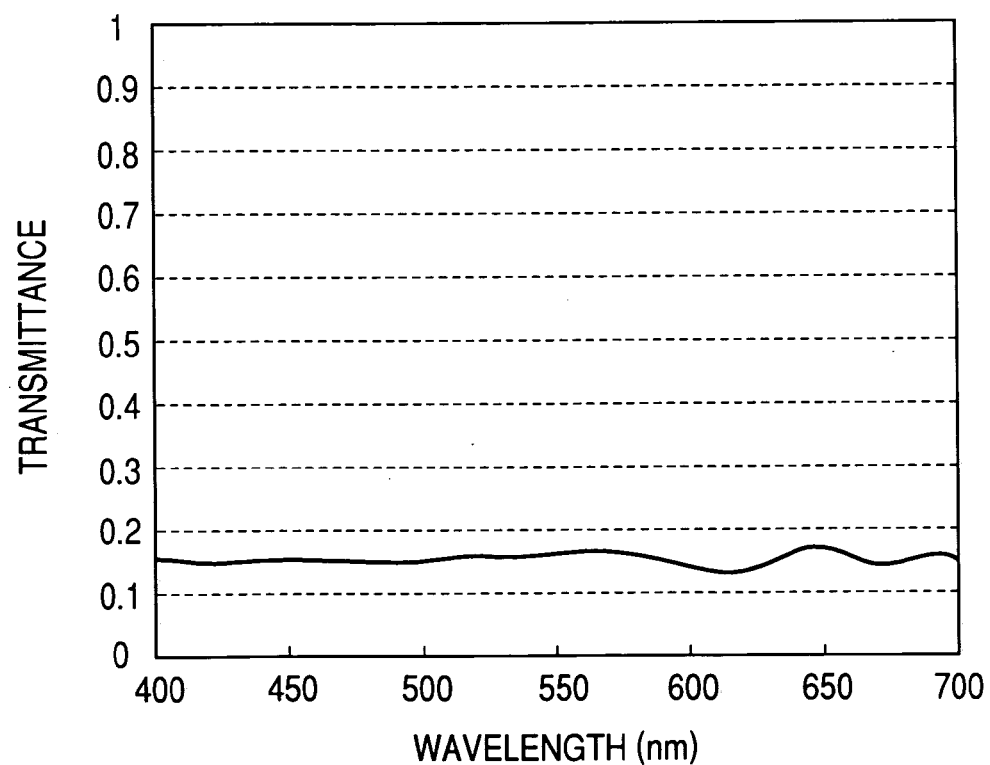
FIG. 11 illustrates a spectral transmittance of an ND filter obtained in EXAMPLE 8 at a portion having an optical density of about 0.8.
Figure 12:
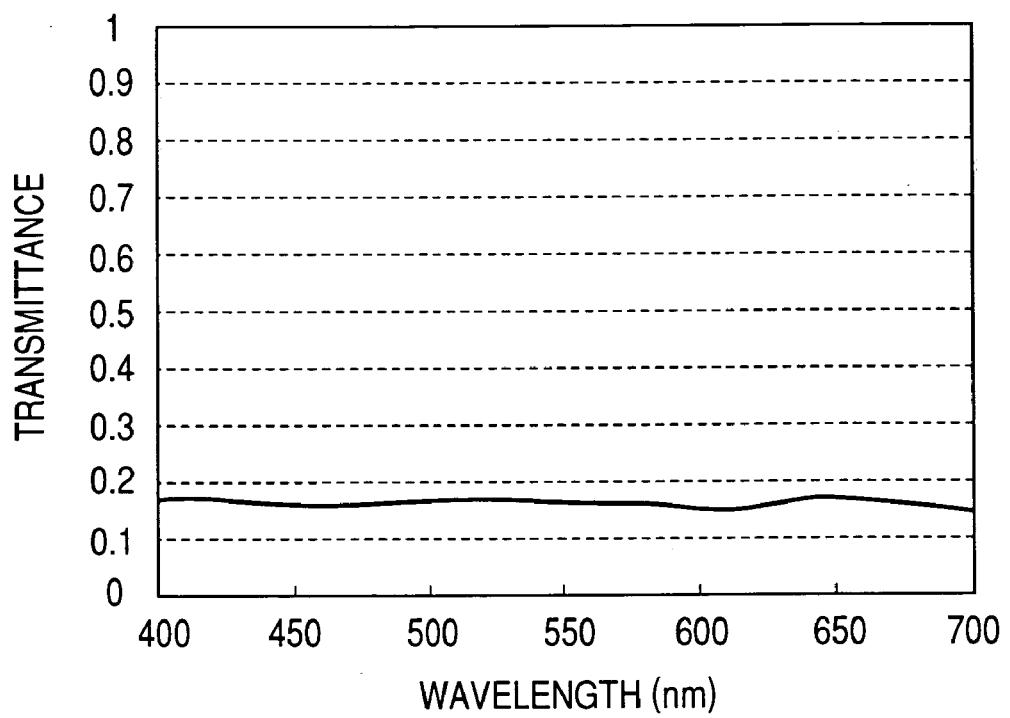
FIG. 12 illustrates a spectral transmittance of an ND filter obtained in EXAMPLE 9 at a portion having an optical density of about 0.8.

FIG. 3 is a diagram where the light amount-adjusting device shown in FIG. 2 is arranged in an optical device. In this embodiment, the optical device described is a video camera, in which a motion picture image or a still picture image is photoelectrically converted into an electrical signal by the image pickup means, and this signal is stored as digital data, for example. Reference numeral 400 indicates a photographing optical system composed of a plurality of lens groups that is constructed by a first lens group 401, a second lens group 402, a third lens group 403 and the diaphragm device 100 illustrated in FIG. 2. The first lens group 401 is a fixed front lens group, the second lens group 402 is a variator lens group, the third lens group 403 is a focusing lens group, and reference numeral 404 indicates an optical low-pass filter. An image pickup means 411 is arranged at a focal position (predetermined image-forming surface) in the photographing optical system 400. The image pick up means 411 may be, for example, a photoelectrically converting means, such as a two-dimensional CCD composed of a plurality of photoelectric converter parts in which incident light energy is converted into electric charge, an electric charge-storing part that stores the electric charge, and an electric charge-transferring part in which the electric charge is transferred and sent to the outside. The image pickup means 411 is driven by an image pickup means-driving circuit 433.

Reference numeral 421 indicates a display device, such as a liquid crystal display, which displays a subject image taken by the image pickup means 411, such as CCD, and operation conditions of the optical apparatus. Reference numeral 422 indicates a group of operation switches composed of a zooming switch, a photographing set up switch, a photographing start switch and a photographing condition switch that presets a shutter speed or the like. Reference numeral 423 indicates an actuator by which a focusing drive is conducted to control the focusing of the photographing optical system 400, and the other members are driven.

CPU 431 calculates whether the degree of an average density matches a numerical value corresponding to a correct exposure stored therein. When a difference occurs, a diaphragm opening is changed according to the difference, or the electric charge storing time to the image pickup means 411 is changed. When the diaphragm is operated, the diaphragm blade-driving lever 103 is turned on the hole 103a by a diaphragm driving circuit 432, thereby vertically sliding the diaphragm blades 101 and 102. Thereby, the size of the optical path hole 106, which is an opening, is changed. The diaphragm opening area or electric charge storing time is changed in such a manner that the correct exposure can be achieved.

The subject image formed at the correct exposure on the image pickup means 411 is converted into an electric signal as a charged quantity for every pixel according to the intensity of the brightness thereof, amplified in an amplifying circuit 441 and then subjected to processing, such as prescribed γ correction in a camera signal processing circuit 442. This processing may be conducted by digital signal processing after the A/D conversion. A video signal produced in such a manner is stored in a recorder 443.

Next, the present invention is described more specifically by the following Examples and the Comparative Example. Hereinafter, all designations of "part" or "parts" and "%" in the following examples mean part or parts by mass and % by mass, unless otherwise expressly noted.

In the examples, ND filters that are light amount-adjusting members, the spectral transmittances of which were constant in a visible range (400 to 700 nm), were produced.

Measurement of Maximum Absorption Wavelength

A polyethylene terephthalate film having a thickness of 75 µm was used as a transparent base material to form a receiving layer for coloring liquids thereon. As a coating formulation for the receiving layer, an aqueous solution containing 10 parts of polyvinyl alcohol resin as a solid matter was used. The resultant coating formulation was applied on to the polyethylene terephthalate film, which was the transparent base material, by means of a wire bar. The thus-applied coating formulation was then dried at 100° C. fro 5 minutes in a hot air drying oven. The thickness of the receiving layer for coloring liquids thus formed was 7 µm.

In order to measure maximum absorption wavelengths of various coloring materials on the transparent base material having the receiving layer obtained above, various coloring materials shown in Table 1 were used to prepare respective test coloring solutions of the following composition.

| <Composition of coloring solution for measurement of maximum absorption wavelength of coloring material> | |
| --- | --- |
| Ethylene glycol | 10 parts |
| 2-Propanol | 5 parts |
| Test coloring material | 3 parts |
| Water | 82 parts. |

Each coloring solution prepared above was then charged into an ink tank of an ink-jet printer that utilizes an electrothermal converter as an energy-generating element (BJS600, trade name, manufactured by Canon Inc.), and applied to the transparent base material having the receiving layer prepared above so as to provide a uniform density, forming a solid image of 3 cm by 1 cm in size. An absorption spectrum of the solid image thus obtained was measured by means of a spectrophotometer of ultraviolet-visible region (U-3300, trade name, manufactured by Hitachi Ltd.) to determine the maximum absorption wavelength. The results thereof are shown in Table 1. As a result, as shown in Table 1, the maximum absorption wavelengths of the respective coloring materials of C.I. Direct Black 168, and Exemplified Compounds 1 to 7, whose structures have been shown previously, on the transparent base material were all within a range of from 630 to 750 nm.

TABLE 1

Maximum absorption wavelengths of respective coloring materials on the transparent base material

| Kind of coloring material | Maximum absorption wavelength on transparent base material (nm) |
| --- | --- |
| C.I. Direct Black 168 | 647 |
| Exemplified Compound 1 | 730 |

TABLE 1-continued

Maximum absorption wavelengths of respective coloring materials on the transparent base material

| Kind of coloring material | Maximum absorption wavelength on transparent base material (nm) |
| --- | --- |
| (phthalocyanine type) Exemplified Compound 2 | 726 |
| (phthalocyanine type) Exemplified Compound 3 | 658 |
| (phthalocyanine type) Exemplified Compound 4 | 702 |
| (phthalocyanine type) Exemplified Compound 5 | 703 |
| (phthalocyanine type) Exemplified Compound 6 | 678 |
| (cyanine type) Exemplified Compound 7 | 740 |
| (cyanine type) | |
| C.I. Food Black 2 | 584 |
| C.I. Direct Yellow 132 | 401 |
| C.I. Direct Yellow 86 | 380 |
| C.I. Direct Blue 199 | 617 |
| C.I. Acid Red 315 | 497 |
| Carbon black (CABOJET 200) | 380 |

EXAMPLE 1

Two liquid compositions of a coloring liquid and a transparent liquid, which had the following respective compositions, were charged into ink tanks of the ink-jet printer (BJS600, trade name, manufactured by Canon Inc.), and applied to the receiving layer of the transparent base material prepared above to form a pattern of a light amount-adjusting member. The coloring liquid was applied to form a colored region having a density gradient where the optical density gradually changes, and the transparent liquid was applied to form a transparent region adjacent to the colored portion, thereby forming a region having desired optical densities.

| <Composition of coloring liquid of EXAMPLE 1> | |
| --- | --- |
| Exemplified Compound 1 | 1.6 parts |
| C.I. Direct Black 168 | 0.6 parts |
| C.I. Food Black 2 | 0.6 parts |
| C.I. Direct Yellow 132 | 0.2 parts |
| C.I. Acid Red 315 | 0.8 parts |
| Ethylene glycol | 10 parts |
| Ethylene glycol mono-n-butyl ether | 10 parts |
| Ion-exchanged water | 76.2 parts. |

| <Composition of transparent liquid> | |
| --- | --- |
| Ethylene glycol | 10 parts |
| Ethylene glycol mono-n-butyl ether | 10 parts |
| Ion-exchanged water | 80 parts. |

A transparent leveling layer was further provided on the thus formed colored resin layer (the colored region) and the transparent resin layer (the transparent region), as follows. First, a coating formulation containing 10 parts by solid of styrene-butadiene copolymer (TR2000C, trade name, product of JSR K.K.) in toluene/methyl ethyl ketone was prepared. This coating formulation was applied onto the colored resin layer and transparent resin layer by means of a wire bar and dried at 100° C. for 5 minutes in a hot air drying oven, thereby forming a transparent leveling layer. The thickness of the leveling layer thus formed was 10 μm. The light amount-adjusting member obtained in such a manner was used to produce an ND filter having the construction shown in FIGS. 1A and 1B.

EXAMPLE 2

An ND filter was produced in the same manner as in EXAMPLE 1, except that a coloring liquid having the following composition was used.

| <Composition of coloring liquid of EXAMPLE 2> | |
| --- | --- |
| C.I. Direct Black 168 | 1.5 parts |
| C.I. Direct Yellow 86 | 0.45 parts |
| C.I. Direct Yellow 132 | 0.15 parts |
| C.I. Direct Blue 199 | 0.3 parts |
| C.I. Acid Red 315 | 0.9 parts |
| Ethylene glycol | 10 parts |
| Ethylene glycol mono-n-butyl ether | 10 parts |
| Ion-exchanged water | 76.7 parts. |

EXAMPLE 3

An ND filter was produced in the same manner as in EXAMPLE 1, except that a coloring liquid having the following composition was used.

| <Composition of coloring liquid of EXAMPLE 3> | |
| --- | --- |
| Exemplified Compound 1 | 1.66 parts |
| C.I. Food Black 2 | 0.66 parts |
| C.I. Direct Yellow 132 | 0.16 parts |
| C.I. Direct Blue 199 | 0.16 parts |
| C.I. Acid Red 315 | 0.83 parts |
| Ethylene glycol | 10 parts |
| Ethylene glycol mono-n-butyl ether | 10 parts |
| Ion-exchanged water | 76.53 parts. |

EXAMPLE 4

An ND filter was produced in the same manner as in EXAMPLE 1, except that a coloring liquid having the following composition was used.

| <Composition of coloring liquid of EXAMPLE 4> | |
| --- | --- |
| Exemplified Compound 2 | 2.1 parts |
| C.I. Direct Blue 199 | 0.21 parts |
| C.I. Food Black 2 | 0.63 parts |
| C.I. Direct Yellow 132 | 0.21 parts |
| C.I. Acid Red 315 | 0.84 parts |
| Ethylene glycol | 10 parts |
| Ethylene glycol mono-n-butyl ether | 10 parts |
| Ion-exchanged water | 76.01 parts. |

EXAMPLE 5

An ND filter was produced in the same manner as in EXAMPLE 1, except that a coloring liquid having the following composition was used.

| <Composition of coloring liquid of EXAMPLE 5> | |
| --- | --- |
| Exemplified Compound 1 | 1.6 parts |
| Exemplified Compound 3 | 0.32 parts |
| C.I. Food Black 2 | 0.8 parts |
| C.I. Direct Yellow 132 | 0.16 parts |
| C.I. Acid Red 315 | 0.8 parts |
| Ethylene glycol | 10 parts |
| Ethylene glycol mono-n-butyl ether | 10 parts |
| Ion-exchanged water | 76.32 parts. |

EXAMPLE 6

An ND filter was produced in the same manner as in EXAMPLE 1, except that a coloring liquid having the following composition was used.

| <Composition of coloring liquid of EXAMPLE 6> | |
| --- | --- |
| Exemplified Compound 4 | 0.46 parts |
| Exemplified Compound 5 | 1.16 parts |
| C.I. Food Black 2 | 0.81 parts |
| C.I. Direct Yellow 132 | 0.11 parts |
| C.I. Acid Red 315 | 0.93 parts |
| Ethylene glycol | 10 parts |
| Ethylene glycol mono-n-butyl ether | 10 parts |
| Ion-exchanged water | 76.53 parts. |

EXAMPLE 7

An ND filter was produced in the same manner as in EXAMPLE 1, except that a coloring liquid having the following composition was used.

| <Composition of coloring liquid of EXAMPLE 7> | |
| --- | --- |
| Exemplified Compound 6 | 0.01 parts |
| Exemplified Compound 7 | 0.6 parts |
| C.I. Food Black 2 | 0.6 parts |
| C.I. Direct Yellow 132 | 0.49 parts |
| C.I. Acid Red 315 | 1.22 parts |
| C.I. Direct Blue 199 | 0.36 parts |
| Ethylene glycol | 10 parts |
| Ethylene glycol mono-n-butyl ether | 10 parts |
| Ion-exchanged water | 76.72 parts. |

EXAMPLE 8

An ND filter was produced in the same manner as in EXAMPLE 1, except that a coloring liquid having the following composition was used.

| <Composition of coloring liquid of EXAMPLE 8> | |
| --- | --- |
| Exemplified Compound 7 | 0.59 parts |
| C.I. Direct Black 168 | 0.12 parts |
| C.I. Food Black 2 | 0.59 parts |
| C.I. Direct Yellow 132 | 0.47 parts |
| C.I. Acid Red 315 | 1.18 parts |
| C.I. Direct Blue 199 | 0.35 parts |

-continued

<Composition of coloring liquid of EXAMPLE 8>

| Ethylene glycol | 10 parts |
|---|---|
| Ethylene glycol mono-n-butyl ether | 10 parts |
| Ion-exchanged water | 76.7 parts. |

EXAMPLE 9

An ND filter was produced in the same manner as in EXAMPLE 1, except that a coloring liquid having the following composition was used.

<Composition of coloring liquid of EXAMPLE 9>

| C.I. Direct Black 168 | 0.44 parts |
|---|---|
| Exemplified Compound 1 | 1.79 parts |
| C.I. Food Black 2 | 0.67 parts |
| Carbon black (CABOJET 200, trade name, product of Cabot Co.) | 0.22 parts |
| C.I. Acid Red 315 | 0.67 parts |
| Ethylene glycol | 10 parts |
| Ethylene glycol mono-n-butyl ether | 10 parts |
| Ion-exchanged water | 76.21 parts. |

COMPARATIVE EXAMPLE 1

An ND filter was produced in the same manner as in EXAMPLE 1, except that a coloring liquid having the following composition was used.

<Composition of coloring liquid of COMPARATIVE EXAMPLE 1>

| C.I. Food Black 2 | 1 parts |
|---|---|
| C.I. Direct Yellow 132 | 0.6 parts |
| C.I. Direct Blue 199 | 0.4 parts |
| C.I. Acid Red 315 | 1.4 parts |
| Ethylene glycol | 10 parts |
| Ethylene glycol mono-n-butyl ether | 10 parts |
| Ion-exchanged water | 76.6 parts. |

EVALUATION OF SPECTRAL TRANSMITTANCE

The spectral transmittance of each ND filter obtained in EXAMPLES 1 to 9 and COMPARATIVE EXAMPLE 1 was determined at a portion of the filter having an optical density of about 0.8 (light transmittance: 0.158) by using a spectrophotometer for ultraviolet and visible regions. The results thereof are shown in FIGS. 4 to 13. The deviation of the spectral transmittance from a central value (light transmittance: 0.158) is shown in Table 2. The deviation of the spectral transmittance from the central value was expressed by a range of % difference of the spectral transmittance from the central value (light transmittance: 0.158) at 400 to 700 nm.

TABLE 2

| Deviation of the spectral transmittance at 400–700 nm from the central value | |
|---|---|
| EXAMPLE 1 | −3.9% to 6.8% |
| EXAMPLE 2 | −5.9% to 10.8% |

TABLE 2-continued

| Deviation of the spectral transmittance at 400–700 nm from the central value | |
|---|---|
| EXAMPLE 3 | −13.7% to 9.8% |
| EXAMPLE 4 | −15.0% to 7.3% |
| EXAMPLE 5 | −4.2% to 17.2% |
| EXAMPLE 6 | −10.1% to 9.6% |
| EXAMPLE 7 | −14.8% to 9.5% |
| EXAMPLE 8 | −14.3% to 9.2% |
| EXAMPLE 9 | −13.7% to 9.8% |
| COMPARATIVE EXAMPLE 1 | −4.2% to 444.4% |

Figure 13:
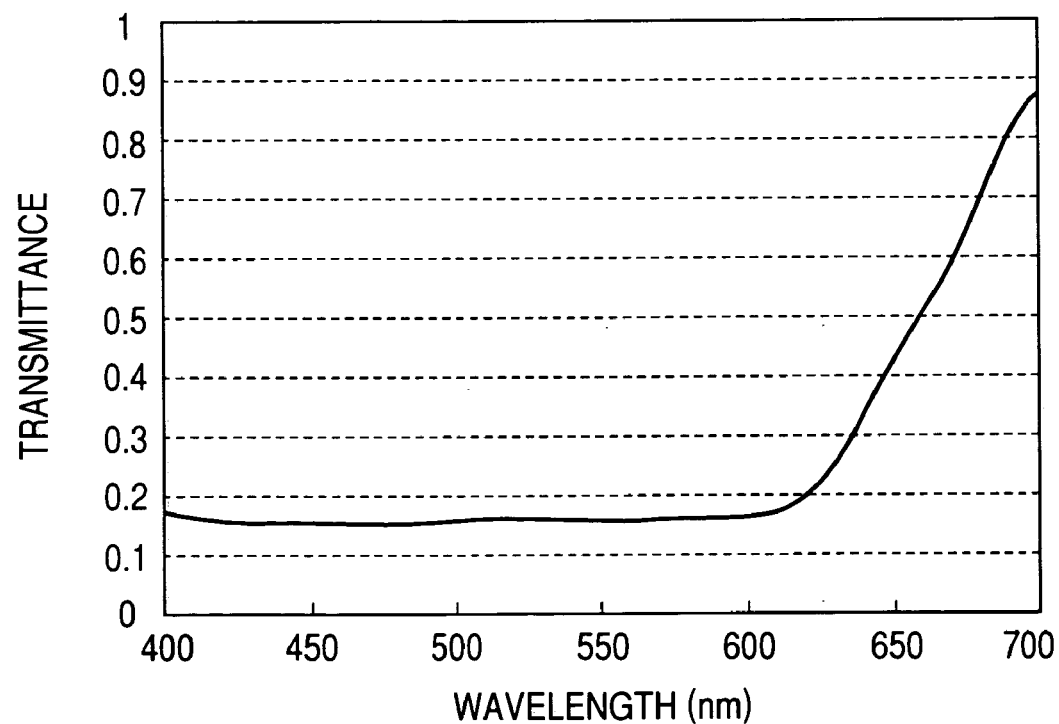
FIG. 13 illustrates a spectral transmittance of an ND filter obtained in COMPARATIVE EXAMPLE 1, at a portion having an optical density of about 0.8.

As shown in FIGS. 4 to 12, the spectral transmittances of the ND filters according to Examples 1 to 9 were almost constant in a visible range (400 to 700 nm), showing good results. Deviation of ±20% from the central value was regarded acceptable. On the other hand, the spectral transmittance of the ND filter according to COMPARATIVE EXAMPLE 1 increased at wavelengths higher than about 620 nm in the visible range (400 to 700 nm), as shown in FIG. 13, greatly exceeding the acceptable deviation range.

As described above, according to the present invention, there are provided simple production processes for forming a light amount-adjusting member having an almost constant spectral transmittance in a visible range (400 to 700 nm) and capable of being used as an ND filter. According to the present invention, there are provided light amount-adjusting members having an almost constant spectral transmittance profile in a visible range (400 to 700 nm, particularly 600 to 700 nm) at a low cost and having excellent optical properties for use as, for example, ND filters. Light amount-adjusting devices and photographing apparatus using such a light amount-adjusting member are also provided at a low cost.

This application claims priority from Japanese Patent Application Nos. 2003-205975, filed Aug. 5, 2003, and 2004-206681, filed Jul. 14, 2004, which are incorporated herein by reference.

What is claimed is:

1. A process for producing a light amount-adjusting member comprising the steps of:

providing a transparent base material and a coloring liquid; and applying the coloring liquid to the base material by ejecting the coloring liquid to the base material to form a colored portion having a specified optical density, wherein the coloring liquid contains at least one coloring material of which maximum absorption wavelength is in a range of from 630 to 750 nm when a solution of the coloring material applied onto the transparent base material is measured, wherein the light amount-adjusting member is a neutral density filter in a visible light range, wherein the at least one coloring material is selected from the group consisting of a compound having a phthalocyanine skeleton represented by general formula (1) and a compound having a cyanine skeleton represented by general formula (2):

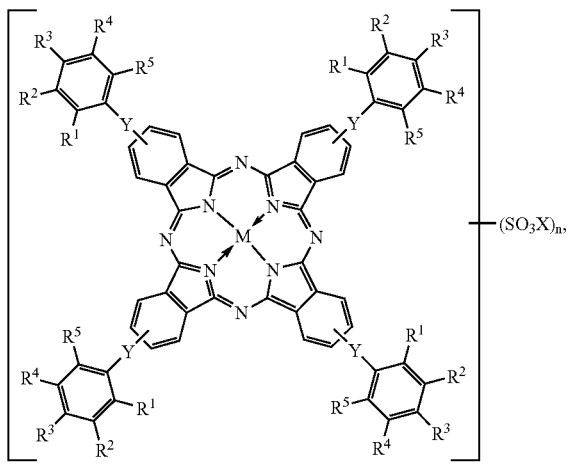

(1)

wherein Y is O or S, $R^1$, $R^2$, $R^3$, $R^4$ and $R^5$ are the same or different independently selected from the group consisting of hydrogen, halogen, a linear, branched or cyclic alkyl group having 1 to 8 carbon atoms, a linear, branched or cyclic alkoxy group having 1 to 8 carbon atoms, a linear or branched hydroxyalkyl group having 1 to 8 carbon atoms, a sulfone group, a sulfonamide group, a carboxyl group, a hydroxyl group, a cyano group, a nitro group, an amino group, a phosphono group, a trifluoromethyl group, —$NR^6R^7$, wherein $R^6$ and $R^7$ are independently hydrogen or an alkyl group having 1 to 8 carbon atoms, —$NHCOCH_3$, —$NHCOCH_2OH$, —$NHCOC_6H_5$, a substituted or unsubstituted phenyl group, a substituted or unsubstituted naphthyl group, a substituted or unsubstituted phenoxy group, and a substituted or unsubstituted thiophenoxy group; M is selected from the group consisting of a non-metal, metal, metal oxide or metal halide; X is hydrogen, alkali metal, ammonium or organic ammonium; and n is an integer of 1 to 20; and

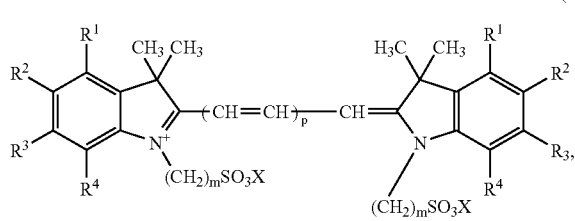

(2)

wherein $R^1$, $R^2$, $R^3$ and $R^4$ are the same or different independently, selected from the group consisting of hydrogen, an alkyl group having 1 to 8 carbon atoms, an alkoxy group having 1 to 8 carbon atoms, a hydroxyalkyl group having 1 to 8 carbon atoms, a substituted or unsubstituted phenyl group, a sulfone group, a carboxyl group, an amino group, —$NR^6R^7$, wherein $R^6$ and $R^7$ are independently hydrogen or an alkyl group having 1 to 8 carbon atoms, —$NHCOCH_3$, —$NHCOCH_2OH$, —$NHCOC_6H_5$ and halogen; X is selected from the group consisting of hydrogen, alkali metal, ammonium and organic ammonium and m and p are integers of 1 to 10.

2. The production process according to claim 1, wherein the process further comprises a step of forming a receiving layer that absorbs the coloring liquid on the surface of the transparent base material before the application step of the coloring liquid.

3. The production process according to claim 1, wherein the coloring liquid contains at least C.I. Direct Black 168 and the compound represented by the general formula (1).

4. The production process according to claim 1, wherein the coloring liquid contains at least C.I. Direct Black 168 and the compound represented by the general formula (2).

5. The production process according to claim 1, which further comprises the step of providing a transparent layer to the surface of the colored portion after the step of forming the colored portion.

6. The production process according to claim 5, which further comprises the step of vapor-depositing an inorganic coating on the surface of the transparent layer provided by the step of providing the transparent layer on the surface of the colored portion, and/or the surface of the transparent base material.

7. The production process according to claim 1, wherein the coloring liquid is applied in a changing amount or a plurality of the coloring liquids containing partially different coloring materials are applied to form a colored region of which optical density changes continuously or stepwise in the region.

8. A light amount-adjusting member produced by a production process according to claim 1.

9. A light amount-adjusting device comprising a light amount-adjusting member according to claim 8.

10. A photographing device comprising a light amount-adjusting device, a photographing optical system for forming a subject image, an image pickup means for photoelectrically converting the subject image formed, and a recording means for recording a signal photoelectrically converted, wherein the light amount-adjusting device is a light amount-adjusting device according to claim 9, and the light amount-adjusting device is arranged in the photographing optical system.

11. The production process according to claim 1, wherein M in the general formula (1) is vanadyl.

12. The production process according to claim 1, wherein the coloring liquid further contains C.I. Food Black 2, C.I. Direct Yellow 132, C.I. Acid Red 315 and C.I. Direct Blue 199 as coloring materials.

* * * * *

UNITED STATES PATENT AND TRADEMARK OFFICE
CERTIFICATE OF CORRECTION

PATENT NO. : 7,189,014 B2
APPLICATION NO. : 10/902150
DATED : March 13, 2007
INVENTOR(S) : Ryuji Katsuragi et al.

It is certified that error appears in the above-identified patent and that said Letters Patent is hereby corrected as shown below:

ON TITLE PAGE [56] REFERENCES CITED:

Foreign Patent Documents, "JP   11-96971   4/1998" should read --JP   10-96971   4/1998--.

ON TITLE PAGE [57] ABSTRACT:

Line 7, "of" should be deleted.

COLUMN 1:

Line 47, "deposition" should read --deposition,--; and
Line 48, "films" should read --film--.

COLUMN 2:

Line 57, "above" should read --above in--.

COLUMN 3:

Line 43, "$NHCOCH_3$,¶" should read -- $–NHCOCH_3$--.

COLUMN 5:

Line 1, "above" should read --above in--; and
Line 4, "above described" should read --above-described--.

COLUMN 7:

Line 39, "$–NR^6{}_R{}^7$" should read -- $–NR^6R^7$--;
Line 41, "$NHCOCH_3$,¶" should read -- $–NHCOCH_3$--; and
Line 47, "a" (first occurrence) should be deleted.

COLUMN 9:

Line 10, "group, ¶" should read --group,--.

UNITED STATES PATENT AND TRADEMARK OFFICE
CERTIFICATE OF CORRECTION

PATENT NO. : 7,189,014 B2  Page 2 of 5
APPLICATION NO. : 10/902150
DATED : March 13, 2007
INVENTOR(S) : Ryuji Katsuragi et al.

It is certified that error appears in the above-identified patent and that said Letters Patent is hereby corrected as shown below:

COLUMN 12:

Line 35-60, "  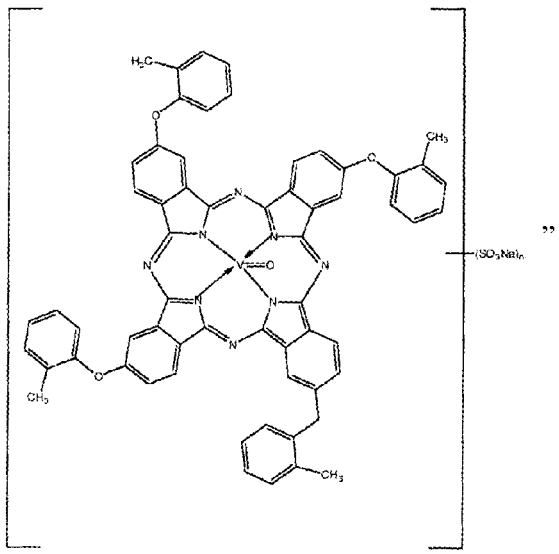  "

should read

-- 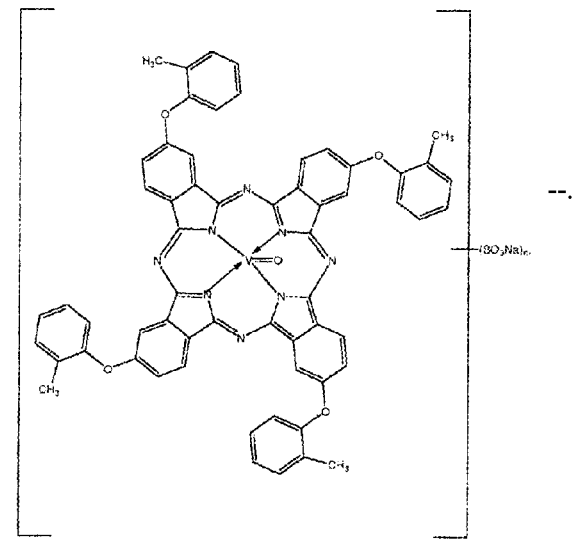 --.

UNITED STATES PATENT AND TRADEMARK OFFICE
CERTIFICATE OF CORRECTION

PATENT NO. : 7,189,014 B2
APPLICATION NO. : 10/902150
DATED : March 13, 2007
INVENTOR(S) : Ryuji Katsuragi et al.

It is certified that error appears in the above-identified patent and that said Letters Patent is hereby corrected as shown below:

COLUMN 14:

Line 62, "10.-" should read --10.--.

COLUMN 15:

Line 27, "of" should be deleted.

COLUMN 19:

Line 8, "¥" should be deleted; and
Line 36, "used" should read --used as--.

COLUMN 20:

Line 1, "can" should read --can be--; and
Line 26, "layer with." should read --layer--.

COLUMN 21:

Line 1, "due" should read --due to--;
Line 7, "come" should read --comes--;
Line 29, "eve" should read --even--;
Line 40, "numerical" should read --numeral--; and
Line 41, "portion 101$p$" should read --portion 101P--.

COLUMN 28:

Line 20, "regarded" should read --regarded as--.

UNITED STATES PATENT AND TRADEMARK OFFICE
CERTIFICATE OF CORRECTION

PATENT NO. : 7,189,014 B2
APPLICATION NO. : 10/902150
DATED : March 13, 2007
INVENTOR(S) : Ryuji Katsuragi et al.

It is certified that error appears in the above-identified patent and that said Letters Patent is hereby corrected as shown below:

COLUMN 29:

Figure (1), " 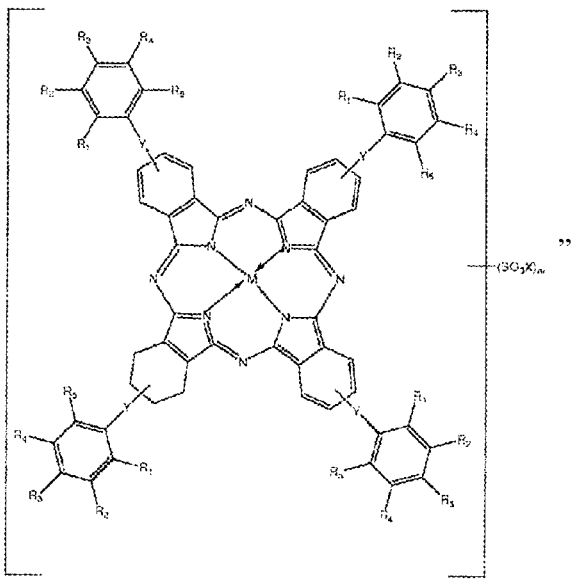 "

should read -- 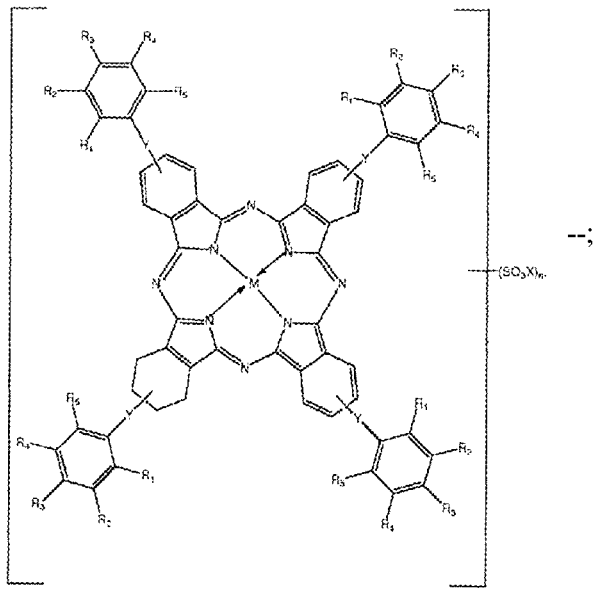 --;

UNITED STATES PATENT AND TRADEMARK OFFICE
CERTIFICATE OF CORRECTION

PATENT NO. : 7,189,014 B2
APPLICATION NO. : 10/902150
DATED : March 13, 2007
INVENTOR(S) : Ryuji Katsuragi et al.

It is certified that error appears in the above-identified patent and that said Letters Patent is hereby corrected as shown below:

COLUMN 29 (cont'd):

Line 24, "different" should read --different,--; and
Line 56, "different" should read --different,--.

Signed and Sealed this

Seventeenth Day of June, 2008

JON W. DUDAS
*Director of the United States Patent and Trademark Office*